United States Patent
Low et al.

(10) Patent No.: US 10,928,970 B2
(45) Date of Patent: Feb. 23, 2021

(54) USER-INTERFACE FOR DEVELOPING APPLICATIONS THAT APPLY MACHINE LEARNING

(71) Applicant: Apple Inc., Cupertino, CA (US)

(72) Inventors: Yucheng Low, Seattle, WA (US); Tim Muss, Seattle, WA (US); Zach Nation, Seattle, WA (US); Eric Wolfe, Seattle, WA (US); Brian Kent, Seattle, WA (US); Chris DuBois, Seattle, WA (US); Alice Zheng, Seattle, WA (US); Ping Wang, Seattle, WA (US); Srikrishna Sridhar, Seattle, WA (US); Carlos Guestrin, Seattle, WA (US)

(73) Assignee: Apple Inc., Cupertino, CA (US)

(*) Notice: Subject to any disclaimer, the term of this patent is extended or adjusted under 35 U.S.C. 154(b) by 361 days.

(21) Appl. No.: 14/804,220

(22) Filed: Jul. 20, 2015

(65) Prior Publication Data

US 2016/0018962 A1    Jan. 21, 2016

Related U.S. Application Data

(60) Provisional application No. 62/026,591, filed on Jul. 18, 2014.

(51) Int. Cl.
| | | |
|---|---|---|
| *G06F 3/048* | (2013.01) | |
| *G06F 3/0481* | (2013.01) | |
| *G06F 8/34* | (2018.01) | |

(52) U.S. Cl.
CPC ............ *G06F 3/0481* (2013.01); *G06F 3/048* (2013.01); *G06F 8/34* (2013.01)

(58) Field of Classification Search
CPC ............ G06F 8/34; G06F 3/048; G06F 3/0481
See application file for complete search history.

(56) References Cited

U.S. PATENT DOCUMENTS

| | | | | |
|---|---|---|---|---|
| 5,551,029 | A * | 8/1996 | Jagadish | G06F 17/30607 |
| 6,009,271 | A * | 12/1999 | Whatley | G06F 17/3048 |
| | | | | 707/999.202 |
| 6,256,651 | B1 * | 7/2001 | Tuli | G06Q 10/06 |
| | | | | 705/7.27 |
| 6,553,366 | B1 * | 4/2003 | Miller | G06F 16/284 |
| 7,590,639 | B1 | 9/2009 | Ivanova et al. | |
| 7,877,370 | B2 | 1/2011 | Piedmonte | |

(Continued)

OTHER PUBLICATIONS

U.S. Appl. No. 14/619,020, filed Feb. 10, 2015, Yucheng Low et al.

(Continued)

*Primary Examiner* — Tadesse Hailu
*Assistant Examiner* — Asteway T Gattew
(74) *Attorney, Agent, or Firm* — Morgan, Lewis & Bockius LLP

(57) ABSTRACT

The various embodiments described herein include methods, systems and/or devices used to visualize data. In one aspect, a method is performed by a computing system having one or more processors and memory. The method includes (1) receiving a request from a user to visualize data, the data stored in a graph dataflow processing system, and (2) in response to the request, invoking an interactive graphical user interface (GUI) for display to the user, the GUI including a first set of visualization data corresponding to a first subset of the data.

20 Claims, 33 Drawing Sheets

(56) References Cited

U.S. PATENT DOCUMENTS

| | | |
|---|---|---|
| 7,899,799 B2 | 3/2011 | Furuya |
| 8,504,568 B2 | 8/2013 | Chandrasekhara |
| 8,612,971 B1 | 12/2013 | Fitzgerald |
| 8,775,476 B2 | 7/2014 | Henderson |
| 8,875,145 B2 | 10/2014 | Atterbury et al. |
| 8,954,418 B2 | 2/2015 | Faerber |
| 9,092,468 B2 | 7/2015 | Nelke et al. |
| 9,165,035 B2 | 10/2015 | McSherry et al. |
| 9,235,652 B1 | 1/2016 | Jeffery et al. |
| 9,411,864 B2 | 8/2016 | Glider et al. |
| 9,430,505 B2 | 8/2016 | Padmanabhan et al. |
| 9,563,486 B1 | 2/2017 | Narsude et al. |
| 9,613,116 B2 | 4/2017 | Bryan et al. |
| 9,792,325 B2 | 10/2017 | Bruno et al. |
| 2002/0083049 A1* | 6/2002 | Forster .............. G06F 16/20 |
| 2002/0143263 A1* | 10/2002 | Shusterman ........ A61B 5/0452 600/509 |
| 2002/0198984 A1* | 12/2002 | Goldstein ........... G06F 11/323 709/224 |
| 2004/0267747 A1 | 12/2004 | Choi et al. |
| 2005/0001837 A1* | 1/2005 | Shannon ............ G06F 3/0481 345/440 |
| 2005/0283337 A1* | 12/2005 | Sayal ................ G06Q 10/00 702/179 |
| 2007/0008317 A1* | 1/2007 | Lundstrom ........... G06T 15/08 345/424 |
| 2007/0038978 A1* | 2/2007 | Meijer ................. G06F 8/437 717/106 |
| 2007/0214111 A1 | 9/2007 | Jin et al. |
| 2009/0271362 A1 | 10/2009 | Moestl |
| 2011/0255424 A1* | 10/2011 | Nelson ................ H04L 43/18 370/252 |
| 2011/0314400 A1* | 12/2011 | Mital ............... G06F 17/30572 715/771 |
| 2012/0089562 A1 | 4/2012 | Deremigio et al. |
| 2012/0150791 A1 | 6/2012 | Willson |
| 2012/0158623 A1* | 6/2012 | Bilenko ............. G06N 99/005 706/12 |
| 2012/0221528 A1 | 8/2012 | Renkes et al. |
| 2012/0239609 A1 | 9/2012 | Zhao et al. |
| 2012/0310916 A1 | 12/2012 | Abadi et al. |
| 2013/0166535 A1 | 6/2013 | Valentin |
| 2014/0280142 A1* | 9/2014 | Wasson ........... G06F 17/30539 707/737 |
| 2014/0282180 A1 | 9/2014 | Orofino |
| 2014/0304251 A1 | 10/2014 | Bornea et al. |
| 2015/0095308 A1 | 4/2015 | Kornacker |
| 2015/0142724 A1 | 5/2015 | Nair |
| 2015/0142777 A1 | 5/2015 | Mindnich |
| 2015/0278397 A1* | 10/2015 | Hendrickson ....... G06F 16/137 707/798 |

OTHER PUBLICATIONS

U.S. Appl. No. 14/619,025, filed Feb. 10, 2015, Haijie Gu et al.
U.S. Appl. No. 16/383,360, filed Apr. 12, 2019, Haijie Gu et al.

\* cited by examiner

USER-INTERFACE FOR DEVELOPING APPLICATIONS THAT APPLY MACHINE LEARNING

RELATED APPLICATIONS

This application claims priority to U.S. Provisional Application No. 62/026,591, filed Jul. 18, 2014, which is hereby incorporated by reference in its entirety.

TECHNICAL FIELD

The disclosed embodiments relate generally to the field of data science, including, but not limited to, methods and systems for applying machine learning models to scalable data sources.

BACKGROUND

Efficient strategies for data manipulation are increasingly necessary as client devices lack the processing and storage capabilities of larger server computing devices. However, manipulating data on a remote server (or set of servers) creates additional complexities that place a substantial burden on ordinary users. In addition, it is difficult to manipulate data obtained from two or more disparate, non-uniform data sources in an efficient way (e.g. combining data from a local CSV file, a remote SQL transactional database, and a flat file).

There are several known tools that facilitate the general software development process. However, there is a need for tools that can provide an end-to-end, prototype to production, interface to build, use and manage software applications that apply machine learning models on scalable data sources.

SUMMARY

Disclosed embodiments address the above deficiencies and other problems associated with efficient data manipulation and parsing.

The disclosed embodiments relate to the field of data science and the software application development pipeline. The disclosed embodiments include an interactive, visual interface (also sometimes called an interactive UI, a GUI, or a canvas) and technologies that enable users to build, use, and manage software applications that apply machine learning models on scalable data sources. In some embodiments, a user can invoke the interactive, visual interface from any programming language either manually or programmatically. For example, some embodiments include a browser-based, interactive visualization experience that augments a development pipeline. Some embodiments can be invoked from Python, IPython or IPython Notebook environments.

In some embodiments, an interactive, visual interface provides the following value to end-users:

TABLE 1

| without the interface | with the interface |
|---|---|
| User manually codes all desired plots (e.g matplotlib) and statistical output | User calls one function to invoke an interactive browser-based UI to see pre-generated plots, graphs and statistics for objects. User can view several analytical views of their objects without writing any additional code |

TABLE 1-continued

| without the interface | with the interface |
|---|---|
| User remembers which objects have been executed and their state in memory | User sees and can navigate through all objects in memory (e.g. data, model, pipeline artifacts, etc.) in one UI, updated in real time |
| User manually assembles lines of code to manipulate objects | User simulates manipulation of objects or a series of objects with a visual UI, then copies the auto-generated code to replicate it programmatically |
| User manually builds interactive dashboards to monitor the development pipeline | User assembles visuals into custom dashboards via UI, then can copy code to reproduce the dashboard |
| User manually assembles a visuals in custom platform to achieve desired result | Users and 3rd-parties can use the interface's platform extensibility to create custom views to augment the interface |

BRIEF DESCRIPTION OF THE DRAWINGS

So that the present disclosure can be understood in greater detail, some particular features of various embodiments are illustrated in the appended drawings. The appended drawings, however, merely illustrate the more pertinent features of the present disclosure and are therefore not to be considered limiting, for the description may admit to other effective features.

Figure 1:
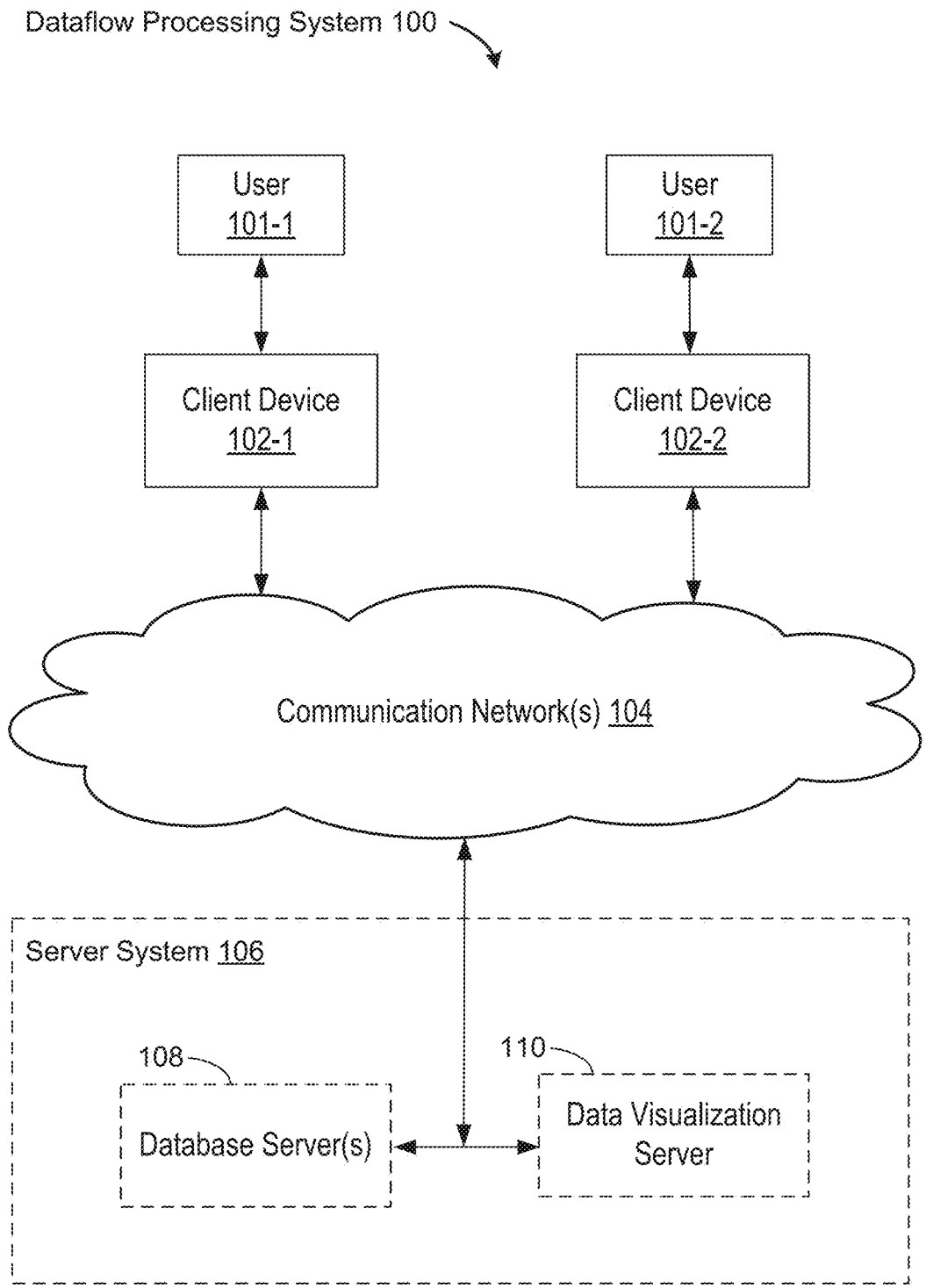
FIG. 1 is a block diagram illustrating an implementation of a graph dataflow processing system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods, devices and/or user interfaces for visualizing data.

Figure 4:
FIG. 4 illustrates a terminal for enabling a user to interact with a graph dataflow processing system, in accordance with some embodiments.
Figure 5:
FIG. 5 illustrates an interactive, visual interface for visualizing and interacting with data, in accordance with some embodiments.

(A1) In one aspect, some embodiments include a method performed at a system having one or more processors and memory (e.g., system 100 and/or system 300). In some embodiments, the method includes (1) receiving a request from a user to visualize data, where the data is stored in a graph dataflow processing system; and (2) in response to the request, invoking an interactive graphical user interface (GUI) for display to the user. The GUI includes a first set of visualization data corresponding to a first subset of the data. For example, FIG. 4 shows a request from a user, "gl.canvas.show( )," and FIG. 5 shows an interactive GUI 500 corresponding to the user's request.

Figure 13:
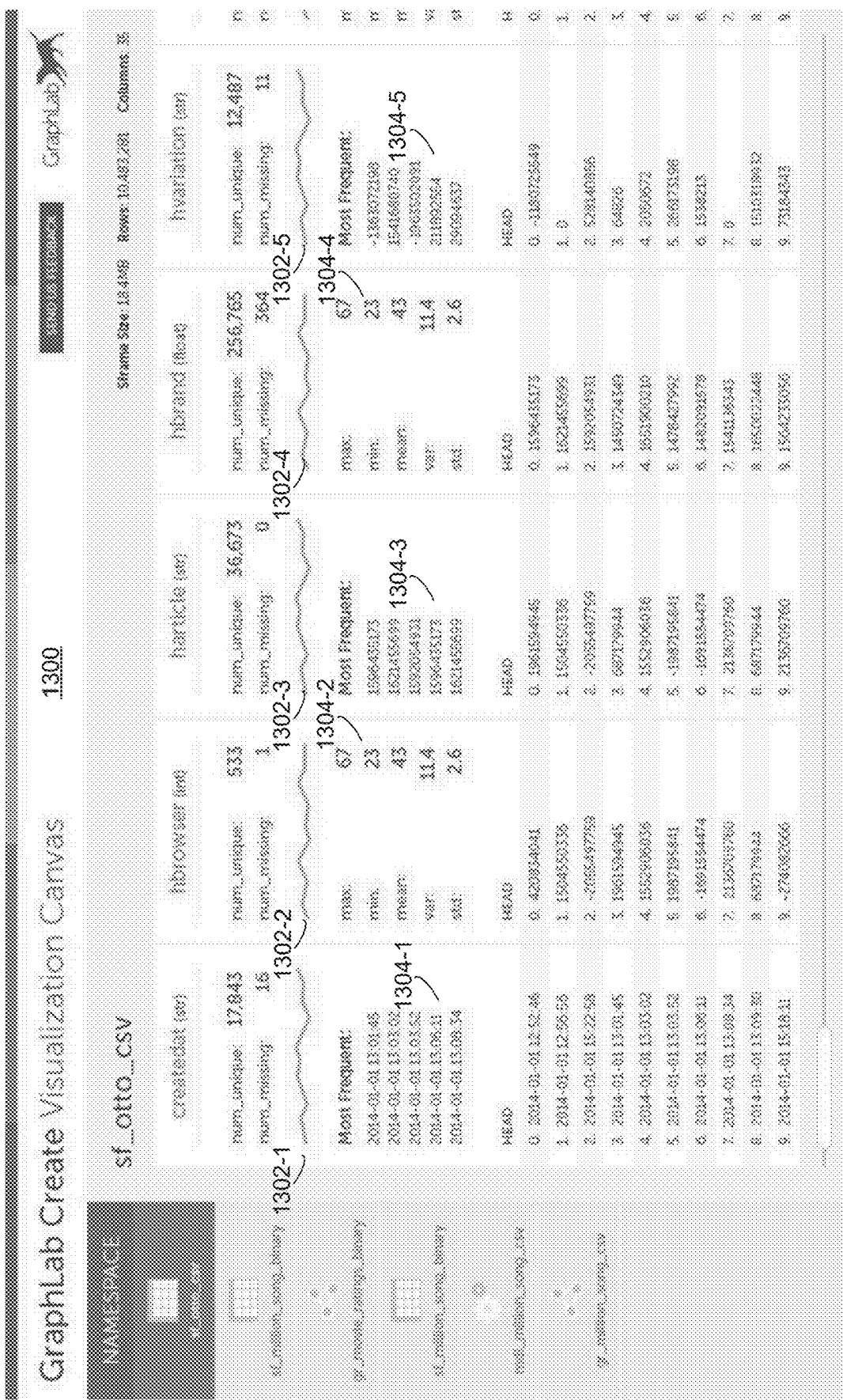
FIG. 13 illustrates an interactive, visual interface including data plots and statistics, in accordance with some embodiments.

(A2) In some embodiments of the method of A1, the first set of visualization data includes at least one of: one or more plots, one or more graphs, and statistics corresponding to the first subset of the data. For example, FIG. 5 shows a set of visualization data including graphs 502-1 through graphs 502-6. As another example, FIG. 13 shows a GUI 1300 including plots 1302-1 through 1302-5 and statistics 1304-1 through 1304-5.

Figure 16:
Figure 19:
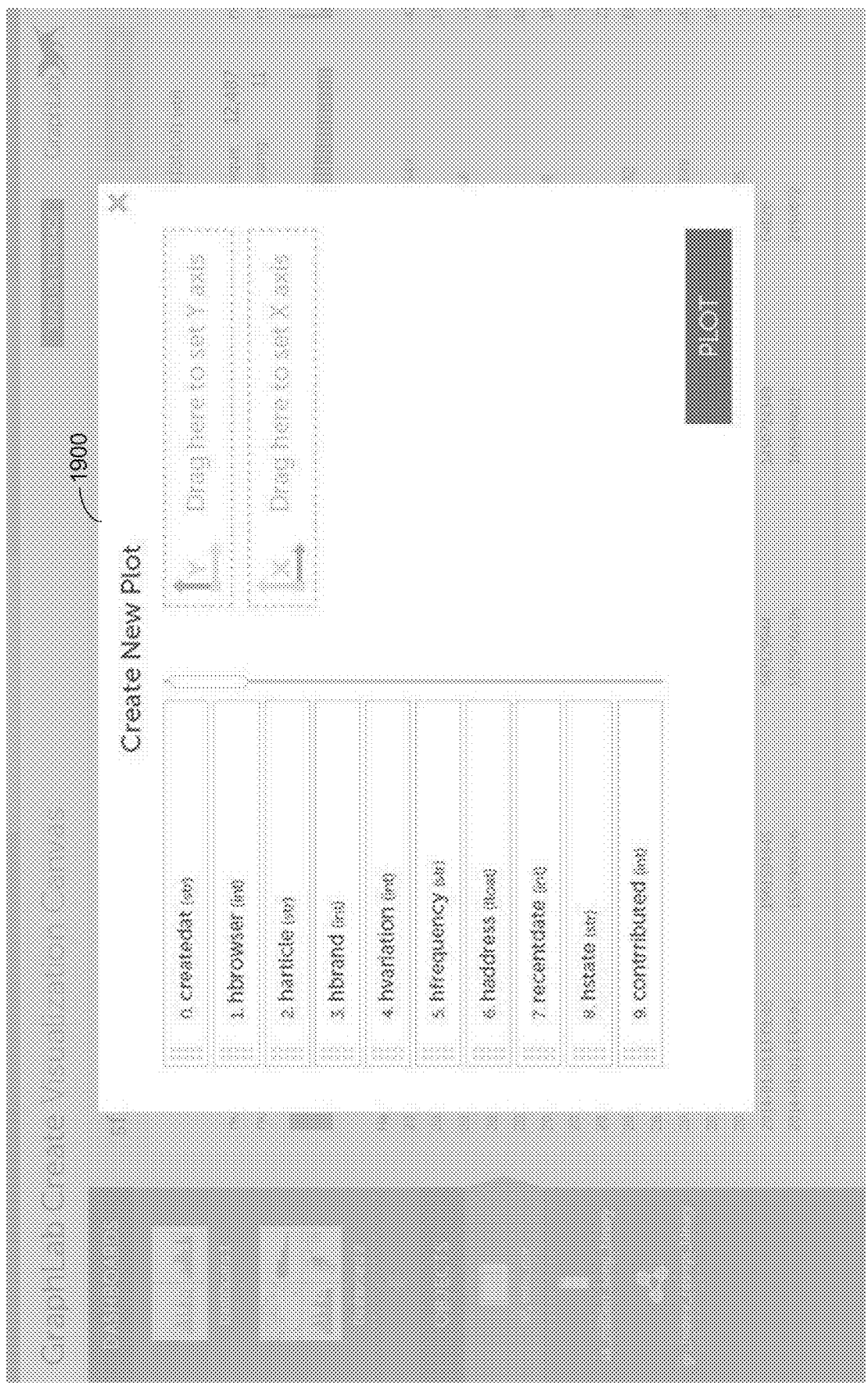
FIG. 19 illustrates an interactive, visual interface for generating new visualization data, in accordance with some embodiments.
Figure 20:
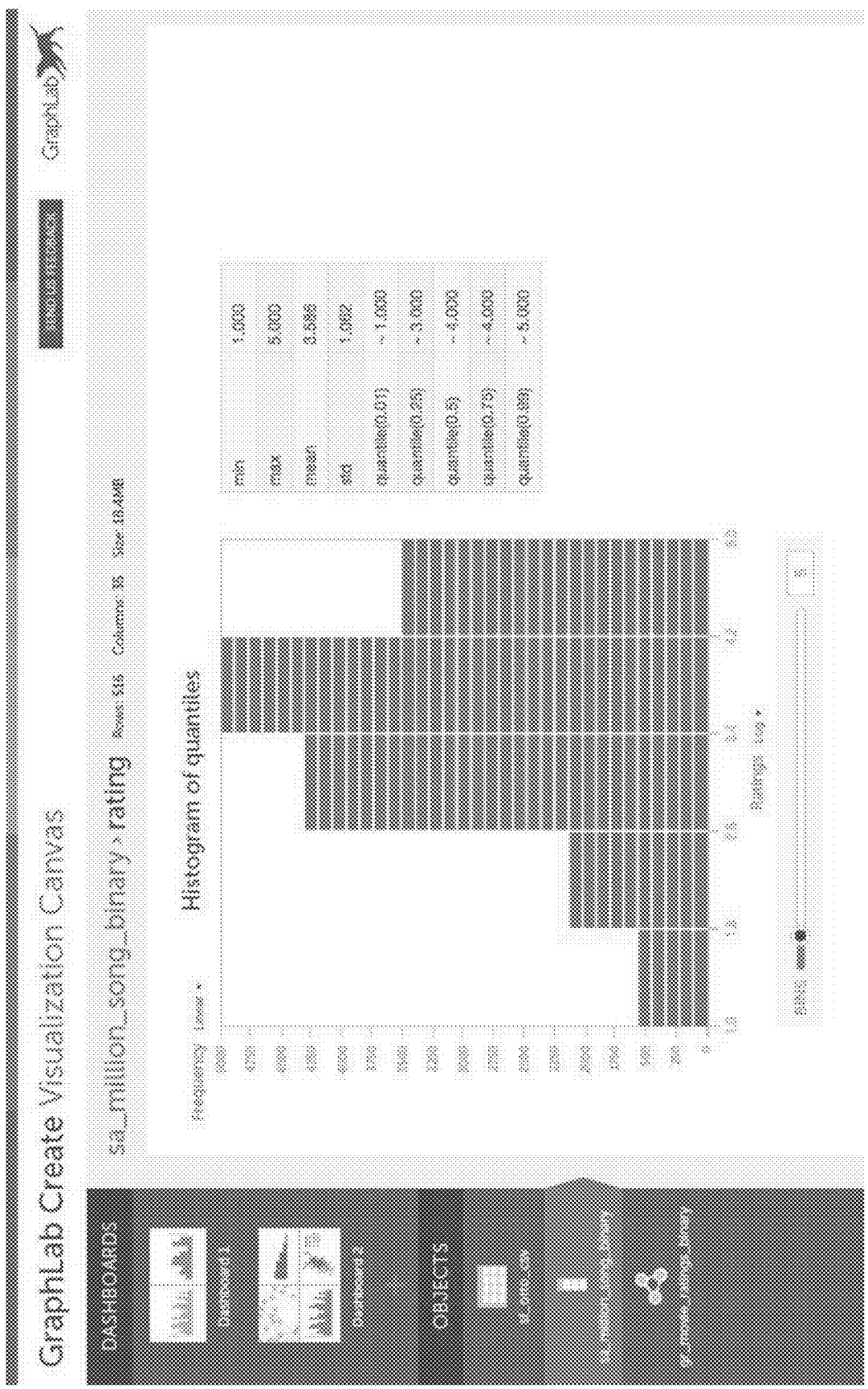
FIGS. 20-22 illustrate an interactive, visual interface for data exploration, in accordance with some embodiments.

(A3) In some embodiments of the method of any of A1-A2, the method further includes (1) receiving a user request, via the GUI, to display a second set of visualization data distinct from the first set; and (2) in response to the request, updating the GUI to include the second set of visualization data. For example, FIG. 16 shows a GUI including a first set of visualization data; FIG. 19 shows a GUI menu enabling a user to generate new plots (e.g., new visualization data); and FIG. 20 shows a GUI including a second set of visualization data, distinct from the first set in FIG. 16.

Figure 10:
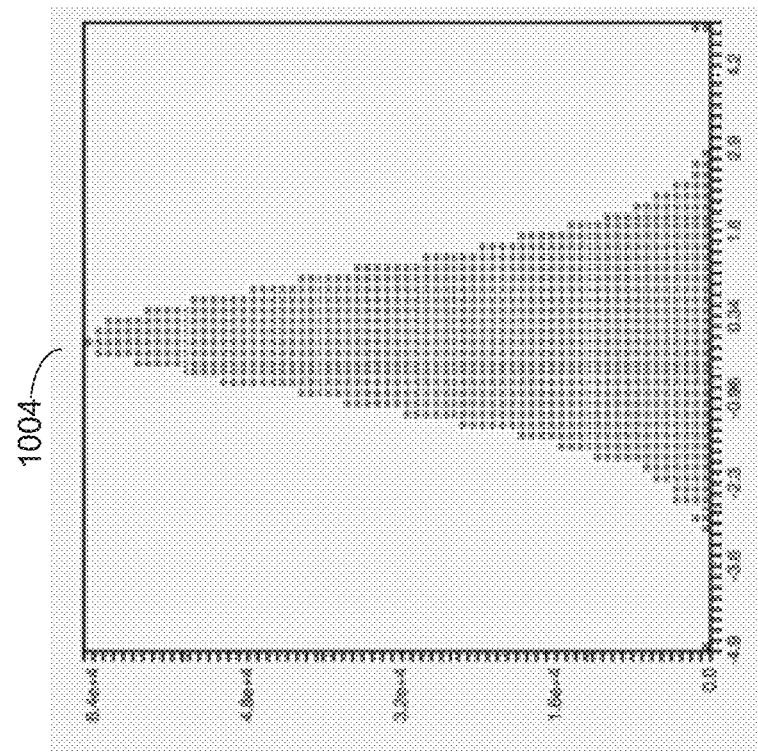
FIG. 10 illustrates an example of visually displaying data at different data resolutions, in accordance with some embodiments.
Figure 10:
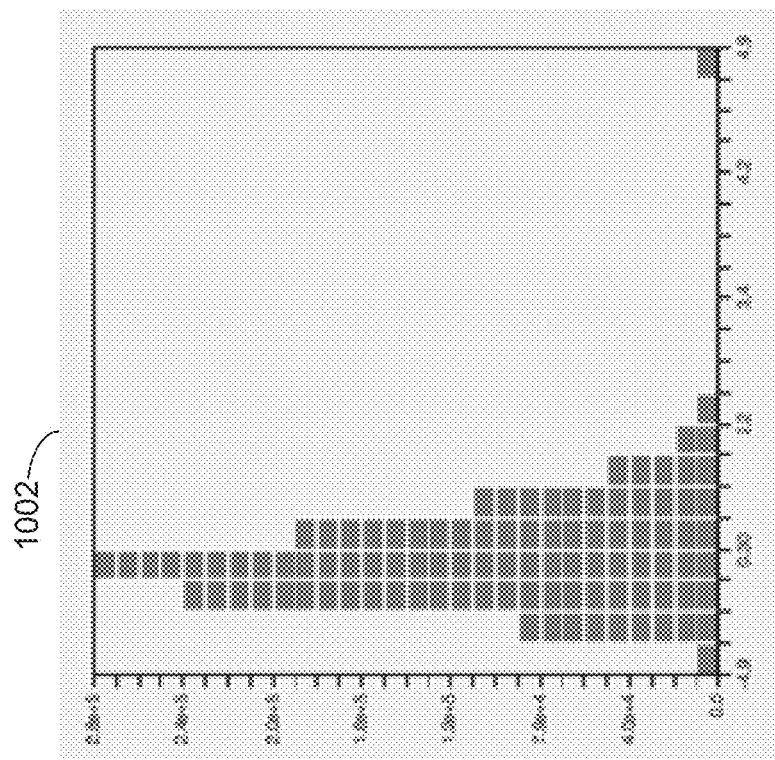

(A4) In some embodiments of the method of A3, the first set of visualization data corresponds to a first data resolution; and the second set of visualization data corresponds to a second data resolution, distinct from the first data resolution. For example, FIG. 10 shows histogram 1002 (e.g., a first set of visualization data) and histogram 1004 (e.g., a second set of visualization data). FIG. 10 also shows histogram 1004 displaying data at a higher resolution than histogram 1002.

Figure 15:
FIGS. 15 and 16 illustrate an interactive, visual interface for data exploration during a data import, in accordance with some embodiments.

(A5) In some embodiments of the method of any of A1-A4, the GUI includes visualization data corresponding to current data operations and the visualization data automatically updates in conjunction with the current data operations. For example, FIGS. 15 and 16 show GUIs 1500 and 1600, which include visualization data. FIGS. 15 and 16 further show the visualization data updating in accordance with a data operation.

Figure 22:

(A6) In some embodiments of the method of any of A1-A5, the method further includes (1) receiving a user request, via the GUI, to modify the first subset of data; and (2) in response to the request: (a) modifying the first subset of data in the graph dataflow processing system; and (b) updating the GUI to include modified visualization data corresponding to the modified data. For example, FIG. 22 shows a GUI 2200 including rating data 2202. In accordance with some embodiments, the rating data 2202 is modified by a user and, in response; both the graph dataflow processing system and the GUI are updated to reflect the modification.

(A7) In some embodiments of the method of A6, modifying the first subset of the data in the graph dataflow processing system includes: (1) sending a data operation query to the graph dataflow processing system; and (2) receiving an update from the graph dataflow processing system corresponding to the modified data.

(A8) In some embodiments of the method of any of A1-A7, the first set of visualization data is generated by utilizing a one-pass algorithm.

(A9) In some embodiments of the method of any of A1-A8, the graph dataflow processing system includes a plurality of data objects; and the GUI includes a second set of visualization data corresponding to the plurality of data objects.

(A10) In some embodiments of the method of A9, the plurality of data objects are implemented via an object-oriented language (e.g., Python); and the second set of visualization data is implemented via a markup language (e.g., HTML).

(A11) In some embodiments of the method of any of A1-A10, the method further includes: (1) saving the first set of visualization data to memory; (2) receiving a user request to display the first set of visualization data; and (3) in response to the user request, retrieving the first set of visualization data from memory.

(A12) In some embodiments of the method of any of A1-A11, the first set of visualization data is automatically generated based on data attributes associated with the first subset of the data.

In another aspect, some embodiments include a graphical user interface on an electronic device with a display, memory, and one or more processors to execute one or more programs stored in the memory, the graphical user interface including user interfaces displayed in accordance with any of the methods described herein (e.g., methods A1-A12).

In another aspect, some embodiments include a system with one or more processors, memory, and one or more programs stored in the memory for execution by the one or more processors, the one or more programs including instructions for performing any of the methods described herein (e.g., methods A1-A12).

In yet another aspect, some embodiments include a non-transitory computer readable storage medium, storing one or more programs for execution by one or more processors of a storage device, the one or more programs including instructions for performing any of the methods described herein (e.g., methods A1-A12).

Thus, systems, graphical user interfaces, and storage mediums are provided with methods for visualizing data, thereby increasing the effectiveness, efficiency, and user satisfaction with such systems, graphical user interfaces, and storage mediums. Such methods may complement or replace conventional methods for visualizing data.

In some embodiments, a scalable frame data structure referred to herein as an SFrame is utilized. An SFrame is architecturally an immutable, column-store, external memory database with full query capabilities, and very high single machine scalability. As a data structure, an SFrame simply behaves like a table with multiple columns, where each column is an SArray (a scalable array). Each SArray is a strongly typed immutable array with the capability to support missing values within the array. A "missing value" is sometimes referred to as a NULL value or a NULL.

SFrames are immutable data structures, which can be queried, but not modified. An operation that modifies the data in an SFrame, such as adding a new column or adding a collection of rows, creates a new SFrame and the original SFrame remains unchanged. An SFrame is structured on a column-store basis. In some embodiments, each column of an SFrame is stored separately in one or more files. This is unlike traditional databases, which store entire rows in one or more files. This column-store basis permits efficient sub-selection of columns during operations that use only a subset of columns for a respective SArray, avoiding the need to load the remaining columns.

For each SFrame, there are two objects: a server-side SFrame object, with references to server-side SArray objects that store data at the server; and a client-side SFrame object that acts as a proxy for the server-side SFrame object. The underlying data for the SFrame is stored at the server, but a user can easily manipulate the data just by interacting with the client-side SFrame object locally. Operations and algorithms that transform SFrame data operate at the server, without transmitting data back to the client-side SFrame object. In fact, some embodiments spread storage and/or processing operations across many servers in a server system, resulting in much faster execution. The complexity of the server operations are handled by the SFrame architecture, and permit a user to issue commands or write programs or scripts as if the data were stored locally.

In some instances, SFrame objects are used to construct graph objects, which have vertices, edges, properties associated with the vertices, and properties associated with the edges. Like an SFrame, each graph object is really a pair of objects: a client-side graph object and a server-side graph object. The client-side graph object acts as a proxy for the server-side graph object, and the server-side graph object accesses the SFrame data stored at the server. In some embodiments, because SFrames handle the disparate data sources, most or all of the graph objects are constructed from SFrame data. The relationship between SFrames and graph objects is many-to-many: a single graph object many be constructed from two or more SFrames, and a single SFrame may be used to construct two or more graph objects.

In accordance with some embodiments, a method operates a server-side data abstraction layer. The method is performed at a server system having one or more processors, non-volatile memory, and volatile memory storing one or more programs configured for execution by the one or more processors. The method includes receiving a first request from a first client object at a first client device, where the first request specifies a data source. The method further includes, in response to receiving the first request, uploading data from the specified data source, storing the data as a plurality of first columns in the non-volatile memory, and instantiating a first server object that provides access to the first columns. Each column of the plurality of first columns includes a plurality of data values all having the same data type. In some instances, some of the data values are missing (a .137 missing data value is considered to have the same data type as the other non-missing values). The method further includes receiving a second request from the first client object at the first client device, where the second request specifies a transformation of the data. In response to receiving the second request, the method includes storing one or more additional columns in the volatile memory and instantiating a second server object that provides access to the additional columns and one or more of the first columns. Each of the additional columns is constructed from the first columns according to the requested transformation, and each of the additional columns has a plurality of data values all having the same data type (which may have some missing values).

In some embodiments, the data source is a Comma Separated Values (CSV) file stored on the first client device, a CSV file stored in the non-volatile memory of the server system, a CSV file stored at a remote location specified by a URL, a flat file stored at the first client device, or a result set retrieved from an SQL database using an SQL query. One of skill in the art recognizes that there are many other types of data sources as well, including server-based databases, desktop databases, spreadsheets, and so on.

In some embodiments, the method further includes receiving a request from the first client object to read the transformed data. In response to receiving the request to read the transformed data, the method includes retrieving the corresponding additional columns and one or more first columns from the non-volatile storage and transmitting the retrieved additional columns and one or more first columns to the first client device.

In some embodiments, the method further includes receiving a request from a client-side graph object at the first client device to use the transformed data, where the request specifies whether to use the transformed data as vertices or edges. In response to receiving the request, the method includes building a server-side graph object corresponding to the client-side graph object. The server-side graph object uses the transformed data, and does not transmit any of the transformed data to the client-side graph object. The server-side graph object has a set of vertices and a set of edges, where each edge connects a pair of vertices.

In some embodiments, each of the first columns is stored as a distinct file (or set of files) in the non-volatile memory, and in some embodiments, each of the first columns has the same number N of data values. In some embodiments, at least one of the first columns has at least one data value that is missing. In some embodiments, the transformation constructs a second column of the additional columns using a formula. For each i in $\{1, 2, \ldots, N\}$, the formula computes the $i^{th}$ data value of the second column using the $i^{th}$ data values of one or more of the first columns.

In some embodiments, the server system includes a plurality of servers, each with a one or more processors, non-volatile memory, and volatile memory storing one or more programs configured for execution by the respective one or more processors.

In some embodiments, the method further includes receiving a request from a second client object at a second client device to build a corresponding second server object whose data comes from the data source as specified by the first request at the first client device. In some embodiments, the method includes determining that the data for the second server object is already stored as the first columns in the non-volatile memory. The method updates metadata for the second server object to access the first columns, thereby providing access to the requested data without re-uploading the data from the specified data source.

Any of the methods described above may be performed by a server system, comprising one or more servers, each having one or more processors, non-volatile memory and volatile memory storing one or more programs configured for execution by the one or more processors. The one or more programs include instructions for performing the various methods.

Any of the methods described above may be performed by one or more programs stored on a computer readable storage medium. The programs are configured for execution by one or more processors of a server system having non-volatile memory and volatile memory. The one or more programs include instructions for performing the various methods.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims.

Sample API

Tables 2-11 below illustrate an example Application Program Interface (API) Design. In some instances, an API is used to operate an interactive, visual interface (e.g., a GUI) in conjunction with terminal access to a graph dataflow processing system. For example, FIGS. 4 and 5, described below, show a terminal accessing a dataflow processing system and a corresponding GUI for visualizing data from the system.

TABLE 2

```
.canvas( )
    graphlab.canvas.set_target(target)
    graphlab.canvas.show( )
.show( )
    SFrame.show('name')
    SArray.show('name')
    Graph.show('name')
```

Table 2 shows two functions that may be used to initialize a GUI and show data corresponding to objects in the dataflow processing system (e.g., an SFrame, SArray, or Graph).

TABLE 3

```
>>> gl.canvas.set_target(gl.canvas.Target.IPYNB)
graphlab.canvas.set_target('target')
Sets the output target for GraphLab visualizations
```

Parameters:

TABLE 4

| target | gl.canvas.Target, optional<br>'NONE' = suppress output<br>'BROWSER' = show in tab of OS default browser (default)<br>'IPYNB' = show in ipython notebook output cell |
|---|---|

Handling Error States

TABLE 5

| Environment | Case | Text String |
|---|---|---|
| ipy, py | .Target.IPYNB | [draft] "IPython notebook not available" |
| any | no browser | [draft] "No browser installed" |

Tables 3-5 show a function, parameters, and error states for setting a visualization output target. For example, Sasha (a user) is working in ipython notebook and wants all visualizations to show in the notebook code cell. Therefore, Sasha enters the target as "IPYNB" as show in Table 3. In another example, Sasha is working in ipython/python in her terminal and wants all subsequent visualizations to show in a browser window. Thus, Sasha enters "BROWSER" as the target for the "set_target" function.

TABLE 6

```
>>> sf.show( )
SFrame.show( )
Displays a summary of the SFrame. Equivalent to clicking a variable
name link in the Canvas namespace UI.
```

Table 6 shows a function for displaying visualizations for a dataflow object (e.g., an SFrame). For example, Sasha is working in ipython notebook and wants to view a visual summary of an SFrame. Alternatively, Sasha is working in ipython/python in her terminal and wants to view a visual summary of a SFrame. In either example, Sasha will invoke the "show( )" function on the SFrame to visualize data corresponding to the SFrame.

TABLE 7

```
>>> sf.show('column_1')
alt:
>>> sf['column_1'].show( )
SFrame.show('name')
Displays a summary of the defined column in defined SFrame.
Equivalent to clicking a SFrame column name link in the Canvas
namespace UI.
```

Table 7 shows a function for displaying visualizations for a column in an SFrame. For example, Sasha is working in ipython notebook (or in ipython/python in her terminal) and wants to view a visual summary of a column in an SFrame. Thus, Sasha will invoke the "show( )" function on the column of the SFrame to visualize that column.

TABLE 8

```
>>> sa.show( )
SArray.show('name')
Displays a visual summary of defined SArray. Equivalent to clicking
a SArray name link in the Canvas namespace UI.
```

Table 8 shows a function for displaying visualizations an SArray. For example, Sasha is working in ipython notebook (or in ipython/python in her terminal) and wants to view a visual summary of an SArray. Thus, Sasha will invoke the "show( )" function on the SArray to visualize the SArray.

TABLE 9

```
>>> g.show( )
Graph.show( )
Displays a visual summary of defined Graph. Equivalent to clicking a
Graph name link in the Canvas namespace UI.
```

Table 9 shows a function for displaying visualizations for a graph. For example, Sasha is working in ipython notebook (or in ipython/python in her terminal) and wants to view a visual summary of a graph. Thus, Sasha will invoke the "show( )" function on the graph to visualize a summary of the graph.

TABLE 10

```
>>> g.canvas.show( )
GraphLab.canvas.show( )
Invokes Canvas in tab in default browser.
```

Handling Error States

TABLE 11

| Environment | Case | Text String |
|---|---|---|
| any | no browser | [draft] "No browser installed" |

Tables 10-11 show a function and error states for invoking the interactive, visual interface. For example, Sasha is working in ipython notebook and now wants to use the interact features in her browser. She can easily invoke the visual interface to show in a tab in her default browser. As another example, Sasha is working in ipython/python in her terminal. She hasn't called the ".show( )" function yet. Now she wants to see what SFrames and SArrays are in the python namespace. She can easily invoke the visual interface to show in a tab in her default browser. As a final example, consider the case where Sasha accidently closes the tab where the visual interface is presented. She can easily re-invoke the visual interface with this "show( )" function. In some embodiments, to accomplish this, an inspect module is utilized to get variable names from the calling scope upon calls to "show( )" or other functions.

In some embodiments, "Python namespace" is defined as the following: all of the visual interface variables (e.g., SFrame, SArray, Graph, and potentially various model types) in the input scope (stdin, Python Console, or IPython Console), and other data structure objects that have had the "show( )" function invoked on them.

Design Discussion

The interactive, visual interface described herein makes it seamless to define and render a Python object to HTML and update state. In some embodiments, an initial set of visualization data is generated by utilizing a one-pass algorithm. For example, the SFrame visualization is based on the sarray.sketch_summary( ) function as shown in Table 12.

TABLE 12

```
Returns a graphlab.Sketch object which can be further queried for
many descriptive statistics over this SArray. Many of the statistics
are approximate.
Returns
-------
out : Sketch
    Sketch object that contains descriptive statistics for this
SArray. Many of the statistics are approximate.
background : boolean
    If True, the sketch construction will return immediately and the
    sketch will be constructed in the background. While this is going
    on, the sketch can be queried incrementally, but at a performance
    penalty. Defaults to False.
```

The sketch summary function essentially computes a large collection of summary statistics about a single column of data in a single pass. These statistics include the following which are computed exactly: max, min, mean, variance, standard deviation, and missing values.

In addition, the following statistics are computed approximately using sketching algorithms: (1) number of unique values (using the hyperloglog sketch); (2) most frequent items (using the space-saving sketch); (3) a queryable interface for the number of occurrences of any value (using a count sketch); and, for numeric types, (4) a queryable interface for the value of any quantile value (based on an adaptation of a quantile sketching algorithm). As used herein, "sketching algorithms" are fast one pass algorithms which provide an approximate estimate of a particular family of statistics. All of the approximate statistics listed above are approximate, but have strong guarantees on how close the values are to the actual values.

The combination of the most frequent items (2) and number of occurrences (1), allows bar charts to be generated on arbitrary categorical or nominal data. The quantile sketch (4) allows histograms to be generated on all numeric data. All of the sketch algorithms allow their accuracy to be tuned thus allowing higher resolution plots to be generated. The one pass guarantee of all the summary algorithms thus provide strong runtime guarantees on all data.

Some embodiments of the visual, interactive interface include one or more of the following functionality. A fast data summarization mechanism based on one-pass algorithms. The use of the fast data summarization system for data visualization purposes. A platform to make rendering a Python object to HTML seamless. A user-interface that allows the user to directly interact with a visual to define and execute a query to remote service. A user-interface that updates in real-time as queries are executed on data. A user-interface that allows for save and replay state of visuals over time. A user-interface that determines the visual presentation of data based on attributes of the data. A user-interface that presents visuals based on machine learning models (e.g., recommends plots or tasks). A user-interface that allows the user control and view data at various resolution of data points.

Table 13 below shows an example summary of some embodiments. In some embodiments, the example summary is displayed in response to receiving a "help" or "info" request from a user.

TABLE 13

NAME graphlab.canvas
FILE

/Users/Tim/venv-build/lib/python2.7/site-packages/graphlab/canvas/_init_.py
DESCRIPTION
  This package contains the implementation of the server component of GraphLab
  Canvas, the visualization engine for GraphLab data structures.
PACKAGE                                                                                            CONTENTS handlers
  inspect
  server
  state
  statichandler
  statichandler_debug
  statichandler_release
  varwrapper
  view
FUNCTIONS set_target(target)
    Set the target for Canvas visualizations. Specifying "browser" will cause
    visualizations to be displayed in a browser window with an interactive view
    of GraphLab objects. Specifying "ipynb" will attempt to render to an output
    cell            in            an            IPython            Notebook.
    Parameters:
    -----------
    target            :            "browser"          |          "ipynb"
  show(variable=None)
    Launch a visualization of GraphLab data structure specified by 'variable'
    in            the           instance         of           View.
    Parameters:
    -----------
    variable       :        SFrame     |       SArray     |      Graph
      The variable to select in Canvas.

Attention will now be directed toward the Figures. FIG. 1 illustrates conceptually a context in which some embodiments operate. Specifically, FIG. 1 illustrates a graph dataflow processing system 100. While some example features are illustrated, various other features have not been illustrated for the sake of brevity and so as not to obscure more pertinent aspects of the example embodiments disclosed herein. A graph dataflow processing system 100 includes client devices 102 (e.g., client device 102-1 and client device 102-2) and associated users 101 (e.g., User 101-1 and User 101-2) coupled, via communication network(s) 104, to the server system 106. In accordance with some embodiments, the server system 106 includes one or more database server(s) 108 and one or more data visualization servers 110, which may be implemented using one or more servers 300.

Examples of the communication network(s) 104 include local area networks ("LAN") and wide area networks ("WAN"), e.g., the Internet. Communication network(s) 104 may be implemented using any known network protocol, including various wired, wireless, and optical protocols, such as e.g., Ethernet, fibre channel, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi Fi, voice over Internet Protocol (VoIP), Wi-MAX, or any other suitable communication protocol.

In some embodiments, the server system 106 includes one or more standalone data processing servers 300, or a distributed network of computers. In some embodiments, the server system 106 also employs various virtual devices and/or services of third party service providers (e.g., third-party cloud service providers) to provide the underlying computing resources and/or infrastructure resources of the server system 106.

In some embodiments, the database server(s) 108 store graphs (also sometimes called graph data structures) and/or graph data (also sometimes called graph information or graph data elements) and receive, and/or respond to, queries and operation requests. Graph data includes one or more graph vertices, one or more graph edges, and one or more properties (also sometimes called fields, graph fields, or graph properties). The properties are associated with a respective vertex or a respective edge, and each property has one or more values (also called property values, data values, or graph data values). The one or more graph vertices and the one or more graph edges are sometimes collectively referred to as a graph structure, graph structure information, or graph structure data.

In some embodiments, the data visualization server 110 receives graph data (e.g., graph dataflow data) from one or more databases (e.g., the database 234 or 324) or from other devices (e.g., a client device 102-1) and generates visual graphs, tables, charts, and/or other visual representations of the data.

Figure 2:
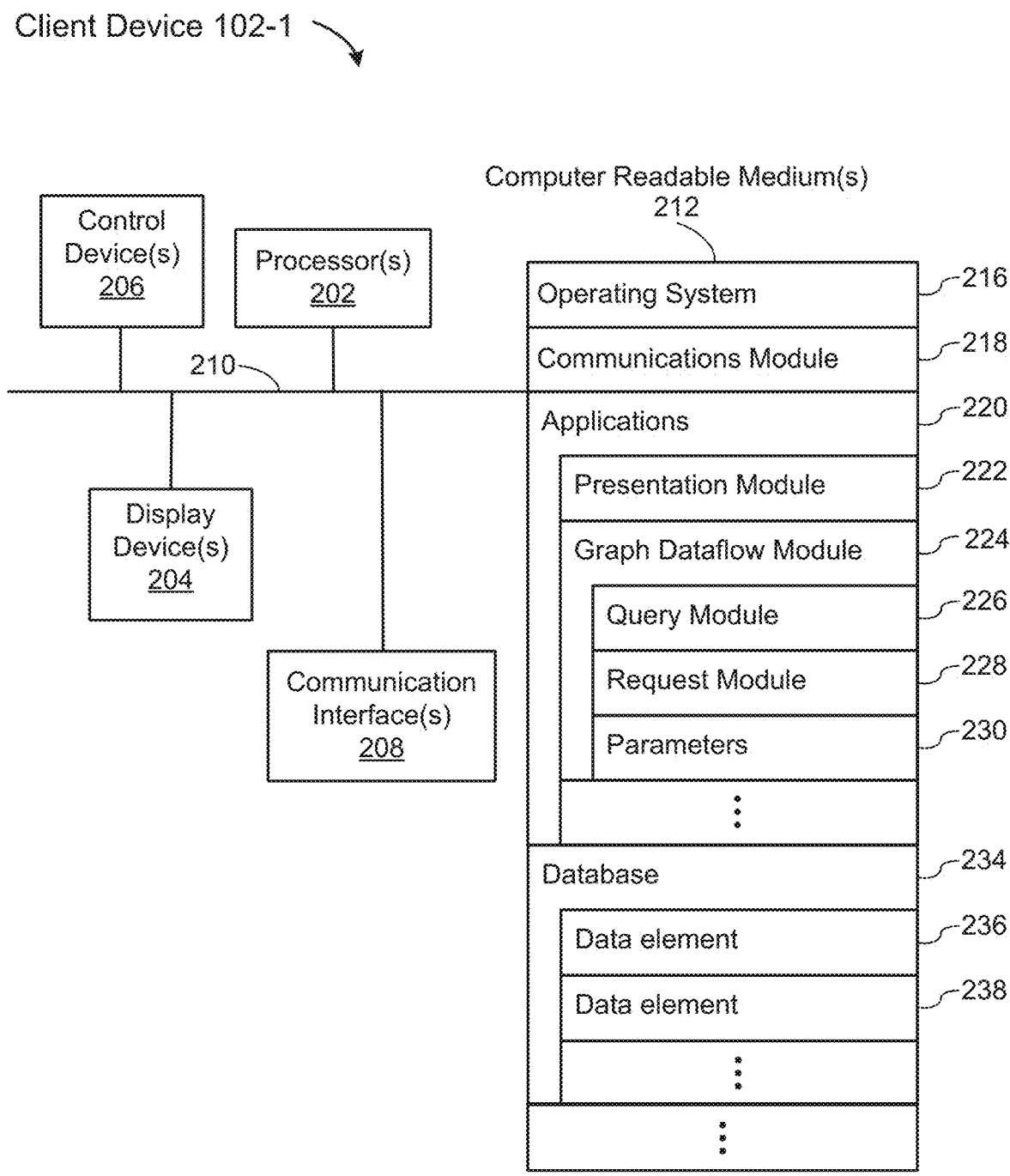
FIG. 2 is a block diagram illustrating a client device in accordance with some embodiments.

FIG. 2 is a block diagram illustrating a client device 102-1 used by a user 101-1 in accordance with some disclosed embodiments. The client device 102-1 is any suitable computer device, such as a desktop computer, a laptop computer, a tablet device, a netbook, an internet kiosk, a personal digital assistant, a mobile phone, a smart phone, a gaming device, or any other computing device. The client device 102-1 includes one or more processors 202 (e.g., one or more CPUs/cores) for executing modules, programs, and/or instructions stored in computer readable medium(s) 212 and thereby performing processing operations. The device 102-1 also includes one or more display devices 204 (e.g., a monitor), one or more control devices 206 (e.g., a keyboard, mouse, trackball, and the like), one or more communication interfaces 208 (e.g., a wireless network interface), one or more computer-readable mediums 212, and one or more communication buses 210 for interconnecting these components. The communication buses 210 optionally include circuitry that interconnects and controls communications between device components. A client devices 102-1 is sometimes called a client computer or a client system. In some embodiments, a client device 102-1 is associated with a plurality of users.

In some embodiments, a client device 102-1 includes a "soft" keyboard, which is displayed as needed on a display device 204, enabling a user 101-1 to "press keys" that appear on a display. In some embodiments, a client device 102-1 includes a touch screen display (also sometimes called a touch sensitive display), a track-pad, a digital camera, and/or any number of supplemental devices to add functionality. In some embodiments, a client device 102-1 includes a user interface. The user interface includes one or more output devices that enable presentation of media content, including one or more speakers and/or one or more visual displays. The user interface also includes one or more input devices, including user interface components that facilitate user input such as a keyboard, a mouse, a voice-command input unit or microphone, a touch screen display, a touch-sensitive input pad, a gesture capturing camera, or other input buttons or controls.

In some embodiments, a client device 102-1 includes one or more types of memory. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory, or alternatively the non-volatile memory device(s) within the memory, is a non-transitory computer readable storage medium (e.g., computer readable medium 212). Optionally, computer readable medium 212 includes one or more storage devices remotely located from processor(s) 202.

In some embodiments, the memory, or the non-transitory computer readable storage medium of the memory (e.g., computer readable medium 212), stores the following programs, modules, and data structures, or a subset or superset thereof:

an operating system 216, which includes procedures for handling various basic system services and for performing hardware dependent tasks;

a communications module 218, which is used for connecting the client device 102-1 to other computers and devices via the one or more communication network interfaces 208 (wired or wireless) and one or more communication networks 104, such as the Internet, other wide area networks, local area networks, metropolitan area networks, and so on;

a plurality of applications 220, including presentation module 222 for enabling presentation of information (e.g., an visual, interactive interface or GUI) at the client device via one or more output devices (e.g., displays, speakers, etc.) associated with a user interface;

the plurality of applications 220 includes a graph dataflow module 224, which receives and/or responds to, operation requests (e.g., via the request module 228) and/or data queries (e.g., via the query module 226) using one or more parameters 230;

an input processing module (not shown) for detecting one or more user inputs or interactions from one of the one or more input devices and interpreting the detected input or interaction; and one or more databases 234 for storing a plurality of data elements (e.g., data elements 236 and 238). The data elements may be used to construct or modify a graph, including the vertices, the edges, and properties of the vertices and edges.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the computer readable medium 212 stores a subset of the modules and data structures identified above. In some embodiments, the computer readable medium 212 stores additional modules and/or data structures not described above.

Although FIG. 2 shows a client device 102-1, FIG. 2 is intended more as functional description of the various features that may be present rather than as a structural schematic of the embodiments described herein. In practice, and as recognized by those of ordinary skill in the art, items shown separately could be combined and some items could be separated. For example, in some embodiments, the control device(s) 206 are combined with the display device(s) 204 in the form of a touch screen display. In some embodiments, the presentation module 222 is combined with (e.g., a component of) the graph dataflow module 224.

Figure 3:
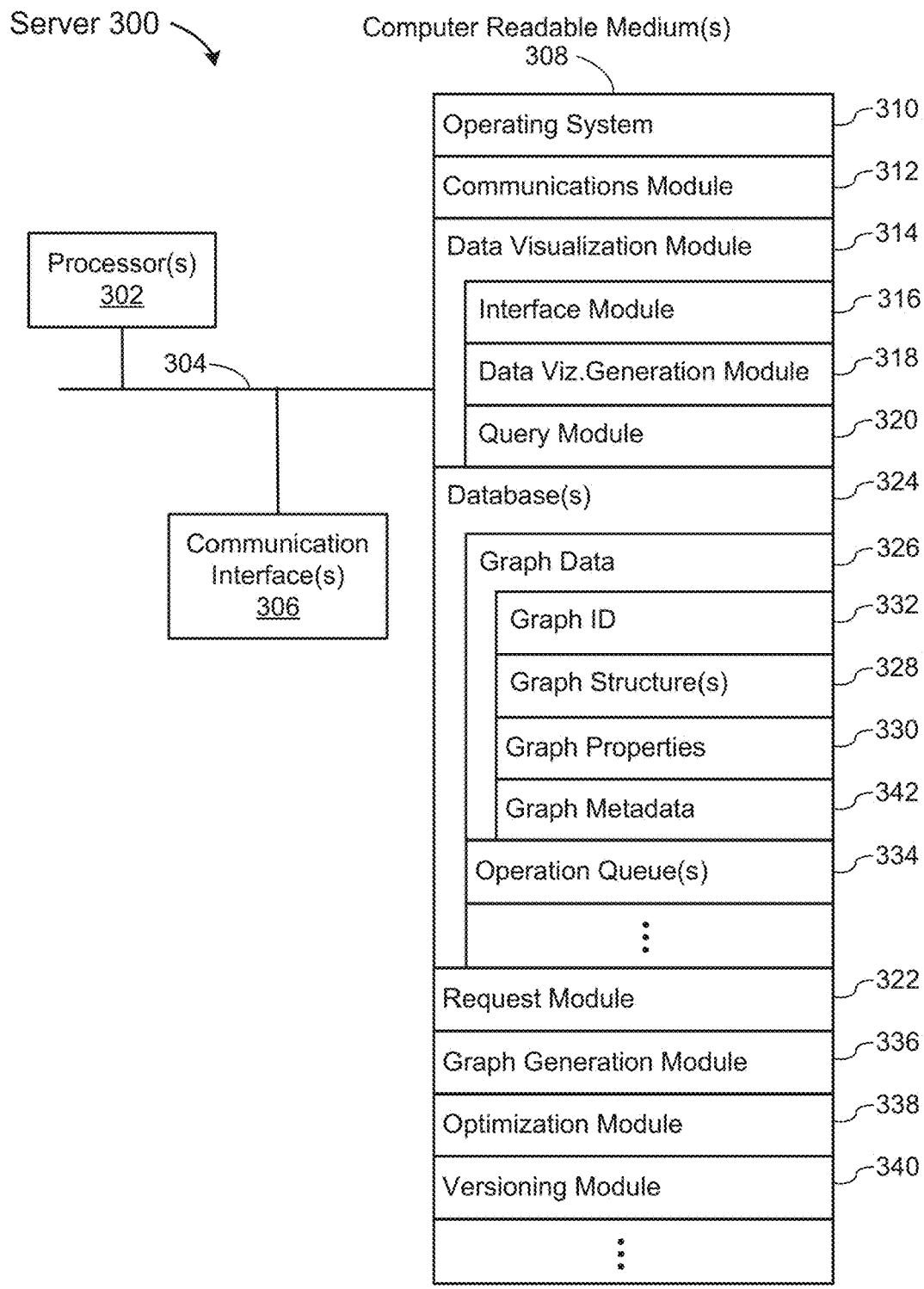
FIG. 3 is a block diagram illustrating a server system in accordance with some embodiments.

FIG. 3 is a block diagram illustrating a server 300. In some embodiments, a server 300 is a component of a server system 106. In some embodiments, a server system 106 includes a plurality of servers 300. In some embodiments, a server 300 includes one or more database servers 108 and one or more data visualization servers 110. In some embodiments, a server 300 is distributed across multiple computers. A server 300 includes one or more processors 302 (e.g., one or more CPUs/cores) for executing modules, programs, and/or instructions stored in a computer readable medium(s) 308 and thereby performing processing operations. A server 300 also includes communication interface(s) 306 (e.g., a wireless network interface), a computer readable storage medium(s) 308, and one or more communication buses 304 for interconnecting these components. The communication buses 304 may include circuitry that interconnects and controls communications between server components. A server 300 is sometimes called a server computer.

In some embodiments, a server 300 includes one or more types of memory. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory, or alternatively the non-volatile memory device(s) within the memory, is a non-transitory computer readable storage medium (e.g., computer readable medium 308). The computer readable medium 308 may include one or more storage devices remotely located from processor(s) 302.

In some embodiments, the communications interface(s) 306 include wired communication port(s) and/or wireless transmission and reception circuitry. The wired communication port(s) receive and send communication signals via one or more wired or optical interfaces, e.g., Ethernet, Universal Serial Bus (USB), FIREWIRE, fibre channel, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The communications interface 306 enables communication between the system 300 with networks 104, such as the Internet, an intranet and/or a wireless network, such as a cellular telephone network, a wireless local area network (LAN) and/or a metropolitan area network (MAN), and other devices such as a client device 102-1.

In some embodiments, the memory, or the non-transitory computer readable storage medium of the memory (e.g., the computer readable medium 308), stores the following programs, modules, and data structures, or a subset or superset thereof: an operating system 310, a communications module 312, a data visualization module 314, and one or more database(s) 324.

The operating system 310 includes various software components and/or drivers for controlling and managing general system tasks (e.g., memory management, storage device control, power management, etc.) and facilitates communications between various hardware, firmware, and software components.

The communications module 312 facilitates communications between the server 300 and other devices using the network communications interface 306. For example, the communications module 312 may communicate with a communication interface 208 of a client device 102-1.

The data visualization module 314 receives data (e.g., graph data) from one or more databases (e.g., database(s) 324) and generates visual graphs, tables, charts, and/or other visual representations of the data. In some embodiments, the data visualization module 314 includes the following sub-modules, or a subset or superset thereof: an interface module 316, a data visualization generation module 318, and a query module 320. The interface module 316 includes a user interface for generating, displaying, and/or updating visual representations of data. The data visualization generation module 318 generates visual graphs, tables, charts, and/or other visual representations of the data. The query module 320 receives queries (e.g., queries sent from a client device 102-1) for graph data and/or sends query requests for graph data to one or more databases (e.g., database(s) 324). In some embodiments, the data visualization module 314, or a portion thereof, is a component of a client system (e.g., client 102-1, FIG. 2). In some embodiments, the data visualization module 314 operates in conjunction with the presentation module 222 to visualize data for a user of the client device 102-1.

The database(s) 324 store graph data 326. In some embodiments, each graph is assigned a graph ID 332, which is used in all communications (e.g., to identify the graph to modify or query). Typically later versions of the same graph use the same graph ID 332, but have an assigned version number, and thus the (graph ID, version no.) pair uniquely identify a graph version. In some embodiments, the graph ID 332 or the version number are stored as part of the graph metadata 342.

The graph data 326 includes graph structure data 328, graph properties 330, and graph metadata 342. In some embodiments, the graph data 326 is partitioned into segments and stored in the database(s) 324 in accordance with the partitioning. In some embodiments, the database(s) 324 store the graph structure data 328 separately from the graph properties 330, but in some embodiments, the structure 328 and properties 330 are combined. In some embodiments, the database(s) 324 store copies of data elements stored in a client database 234 (e.g., data elements 236).

In some embodiments, as graph operation requests are received they are placed into an operation queue 334. The queued operations are not executed until needed. In some instances, the queued operations are combined, reordered, or otherwise modified in order to optimize the processing.

In some embodiments, the server 300 includes the following modules, or a subset or superset thereof: a request module 322, a graph generation module 336, an optimization module 338, and a versioning module 340.

The request module 322 receives operation requests (e.g., operation requests sent from a client device 102-1) to construct or modify a graph stored in one or more databases database(s) 324. Operation requests include requests to modify a corresponding graph structure 328, graph properties 330, or graph metadata 342 associated with a graph. The metadata 342 may include data corresponding to graph access times, graph data modification times, operation pipelining, logical to physical mapping for graph data, graph versioning, and so on. In some embodiments, the metadata 342 is stored remotely from database(s) 324.

The graph generation module 336 generates graphs (e.g., generates a new version of an existing graph) or graph data. The optimization module 338 increases the overall speed of operations in various ways, including pipelining operation requests or combining operations. In some embodiments, the optimization module 338 is able to eliminate processing altogether by generating new graph versions only as required by query requests. In some embodiments, the creation of new graph versions is controlled by a separate versioning module 340. In some embodiments, the versioning module 340 generates a new version of a graph each time a graph is modified. In some embodiments, the graph metadata 342 stores both logical versions of each graph (e.g., a new logical version corresponding to each modification) as well as physical versions (e.g., creating new physical versions only as needed based on user queries). In some instances, two or more logical versions correspond to the same physical version.

In some embodiments, the memory, or the non-transitory computer readable storage medium of the memory, further includes an input processing module (not shown) for detecting one or more user inputs or interactions from one of the one or more input devices and interpreting the detected input or interaction.

The various components shown in FIG. 3 may be implemented in hardware, software instructions for execution by one or more processors/cores, firmware, including one or more signal processing and/or application specific integrated circuits, or a combination of thereof. The processor(s) 302 execute the above described modules, programs, and instructions, and read/write from/to the data structures.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the computer readable medium 308 stores a subset of the modules and data structures identified above. In some embodiments, the computer readable medium 308 stores additional modules and/or data structures not described above.

Although FIG. 3 shows server 300, FIG. 3 is intended more as functional description of the various features that may be present rather than as a structural schematic of the embodiments described herein. In practice, and as recognized by those of ordinary skill in the art, items shown separately could be combined and some items could be separated. For example, in some embodiments, the versioning module 340 is a sub-module of the optimization module 338. In some embodiments, the optimization module 338 is a sub-module of request module 322.

FIGS. 4-5 illustrate a terminal corresponding to a dataflow system operating in conjunction with a visual, interactive interface, in accordance with some embodiments. FIG. 4 shows the terminal for enabling a user to interact with a graph dataflow processing systems. FIG. 4 further shows the "show( )" function invoked for some embodiments. FIG. 5 illustrates an interactive, visual interface for visualizing and interacting with data displayed in response to the "show( )" function.

Figure 6:
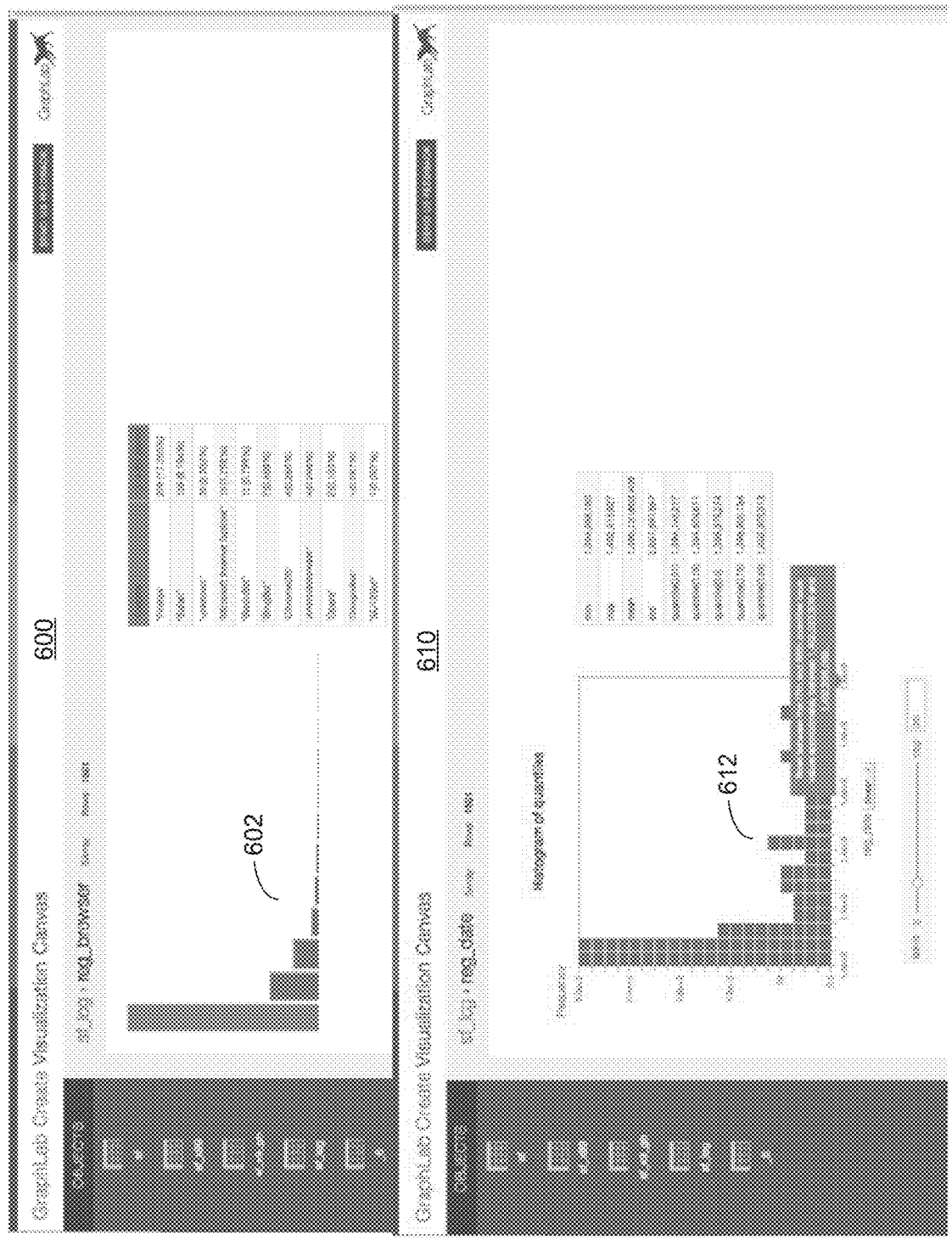
FIG. 6 illustrates interactive UIs including sets of visualization data, in accordance with some embodiments.

FIG. 6 illustrates interactive UIs 600 and 610 including sets of visualization data 602 and 612, in accordance with some embodiments. The interactive UI 600 includes a bar chart and statistics for visualization data corresponding to the "reg_browser" SArray. The interactive UI 610 shows a histogram and statistics for visualization data corresponding to the "reg_date" SArray.

Figure 7:
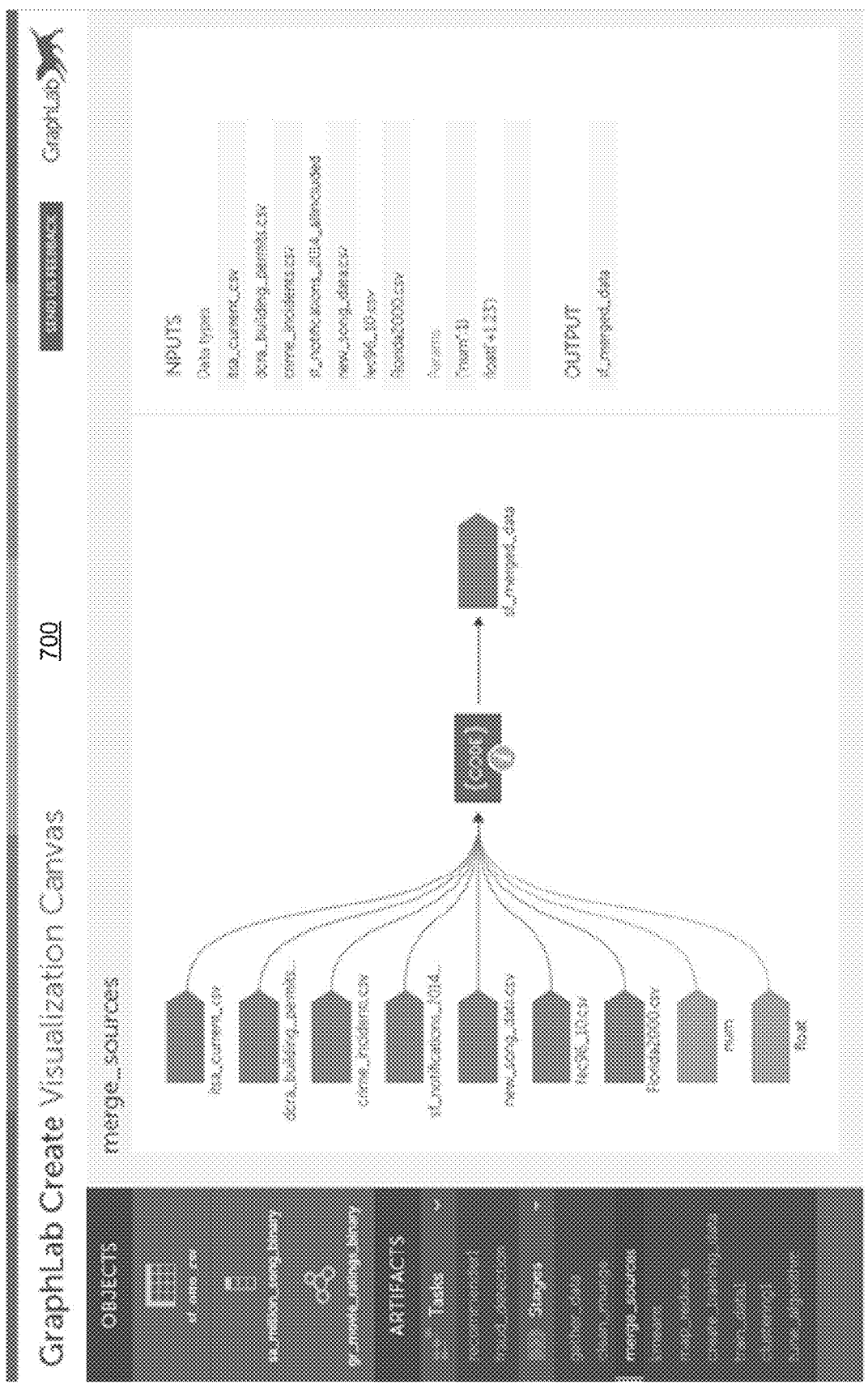
FIG. 7 illustrates an interactive UI including an interactive pipeline workflow visualization, in accordance with some embodiments.

FIG. 7 illustrates an interactive UI 700 including an interactive pipeline workflow visualization, in accordance with some embodiments. The interactive UI 700 includes a list of tasks, a list of stages, and a visualization of the "merge_sources" stage including information corresponding to the inputs, outputs, and parameters.

Figure 8:
FIG. 8 illustrates an interactive UI including interactive data exploration in tabular form, in accordance with some embodiments.

FIG. 8 illustrates an interactive UI 800 including interactive data exploration in tabular form, in accordance with some embodiments. The interactive UI 800 includes a visualization of data stored in "sf_otto_csv", a CSV file, namely the numerical ratings particular users have assigned to particular movies.

Figure 9:
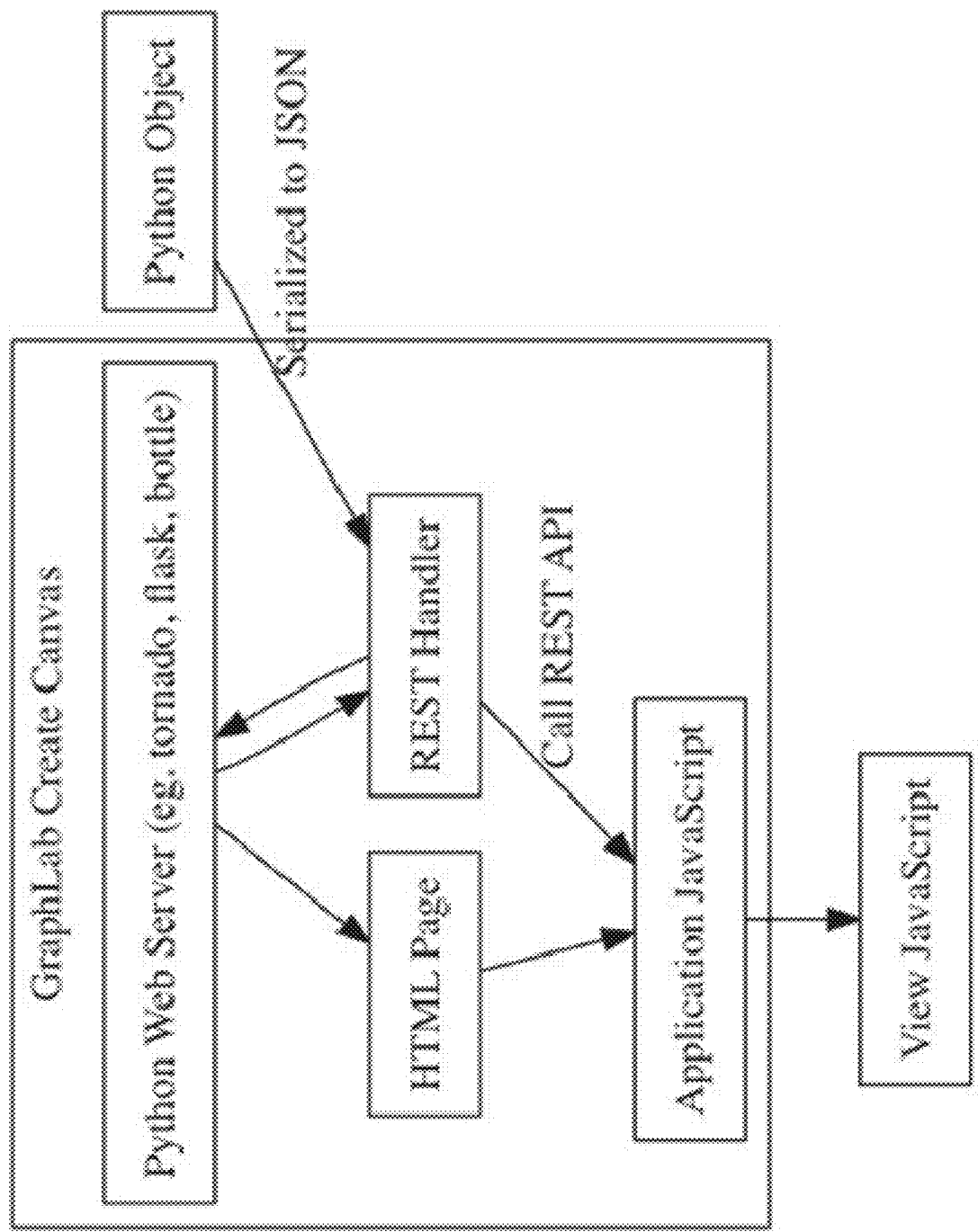
FIG. 9 illustrates architecture for data visualization, in accordance with some embodiments.

FIG. 9 illustrates architecture for data visualization, in accordance with some embodiments. FIG. 9 shows that some embodiments include a representational state transfer (REST) handler for receiving python objects, a python web server to generate the visualization data from received python objects, an HTML page to display the visualization data, and application JavaScript for enabling user interaction with displayed visualization data. In some embodiments, other programming languages are utilized including other markup languages, such as XML or HTML5 (in place of or in addition to HTML), and/or other interpreted languages such as Java, Perl, or Tcl (in place of or in addition to Python).

FIG. 10 illustrates an example of visually displaying data at different data resolutions, in accordance with some embodiments. FIG. 10 shows two histograms of the same data set, a histogram 1002 and a histogram 1004. FIG. 10 also shows the histogram 1004 displaying data at a higher resolution than the histogram 1002.

Figure 11:
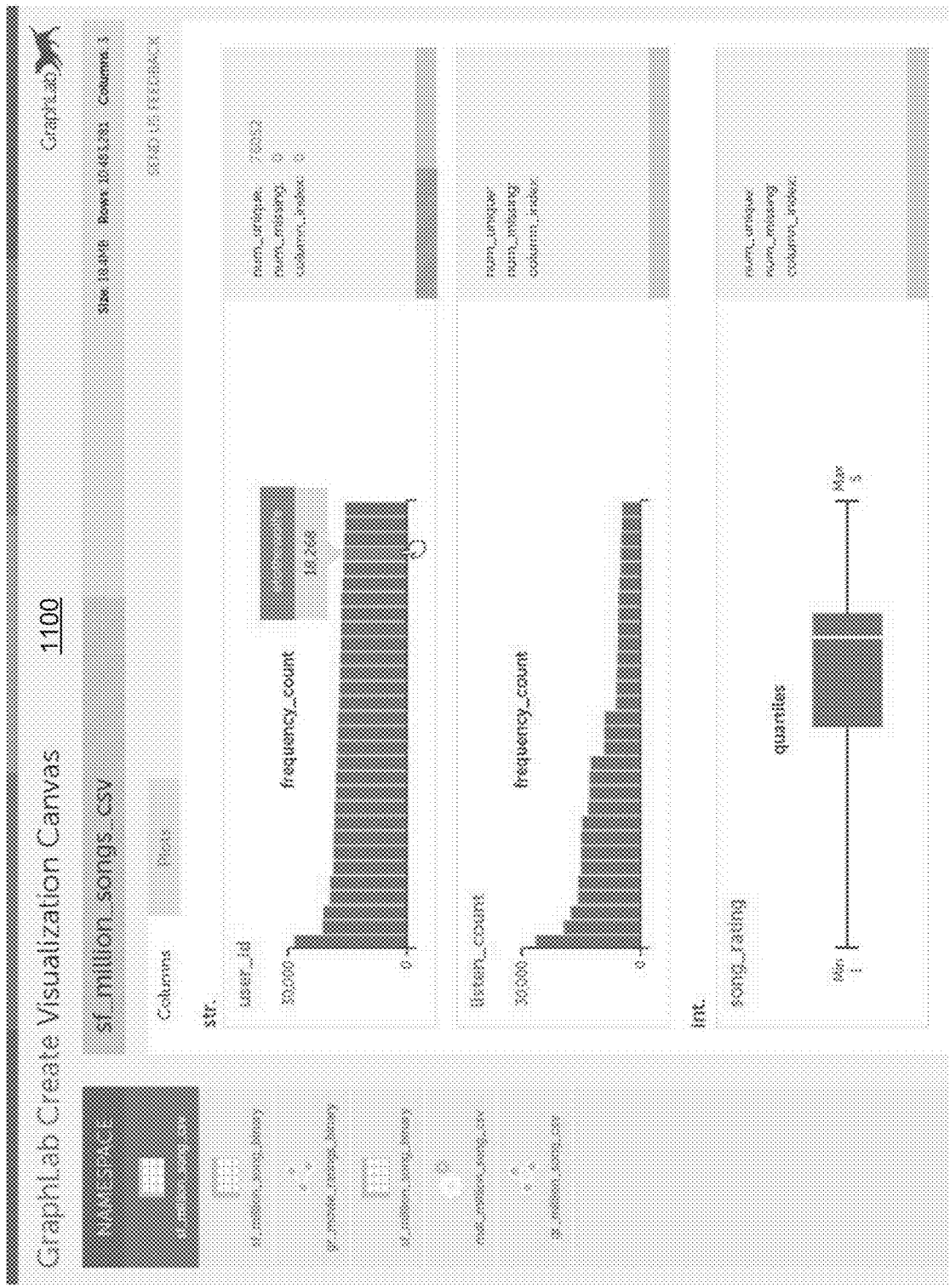
FIGS. 11 and 12 illustrate an interactive, visual interface including data graphs, in accordance with some embodiments.
Figure 12:
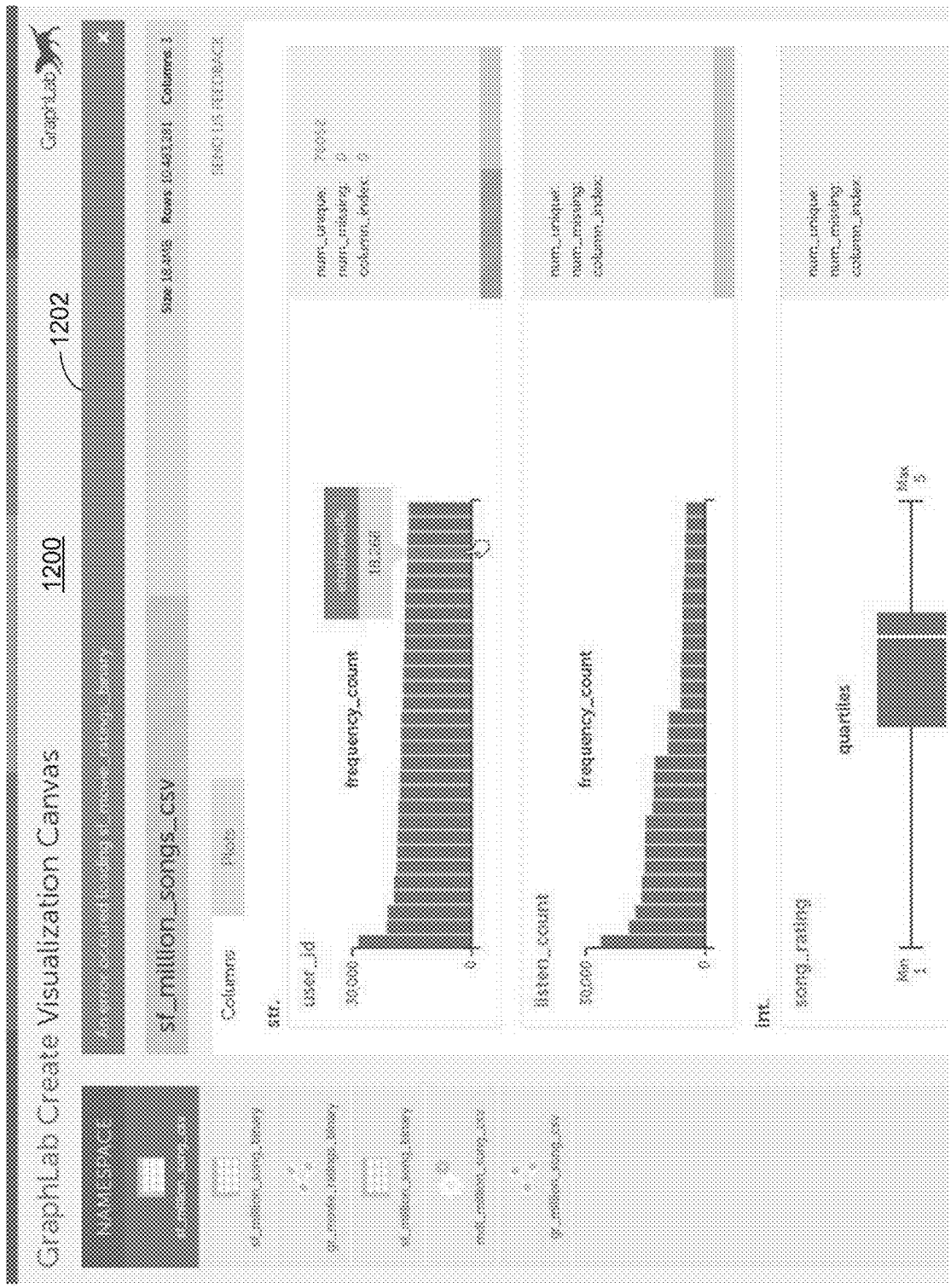

FIGS. 11 and 12 illustrate an interactive, visual interface including data graphs, in accordance with some embodiments. FIG. 11 shows an interactive UI 1100 including visualization data corresponding to input file "sf_million_songs_csv." The visualization data includes a frequency count for the "user_id" and "listen_count" fields and quartiles for the "song_rating" field. FIG. 12 shows an interactive UI 1200, which is identical to the interactive UI 1100 except that the interactive UI 1200 includes a notification bar 1202 for displaying notifications to a user. In the example of FIG. 12, the notification bar 1202 displays an error message to the user regarding loading a particular input file, "sf_movie_ratings_binary."

FIG. 13 illustrates an interactive, visual interface including data plots and statistics, in accordance with some embodiments. FIG. 13 shows an interactive UI 1300 including plots 1302-1 through 1302-5 and statistics 1304-1 through 1304-5 corresponding to data from input file "sf_otto_csv."

Figure 14:
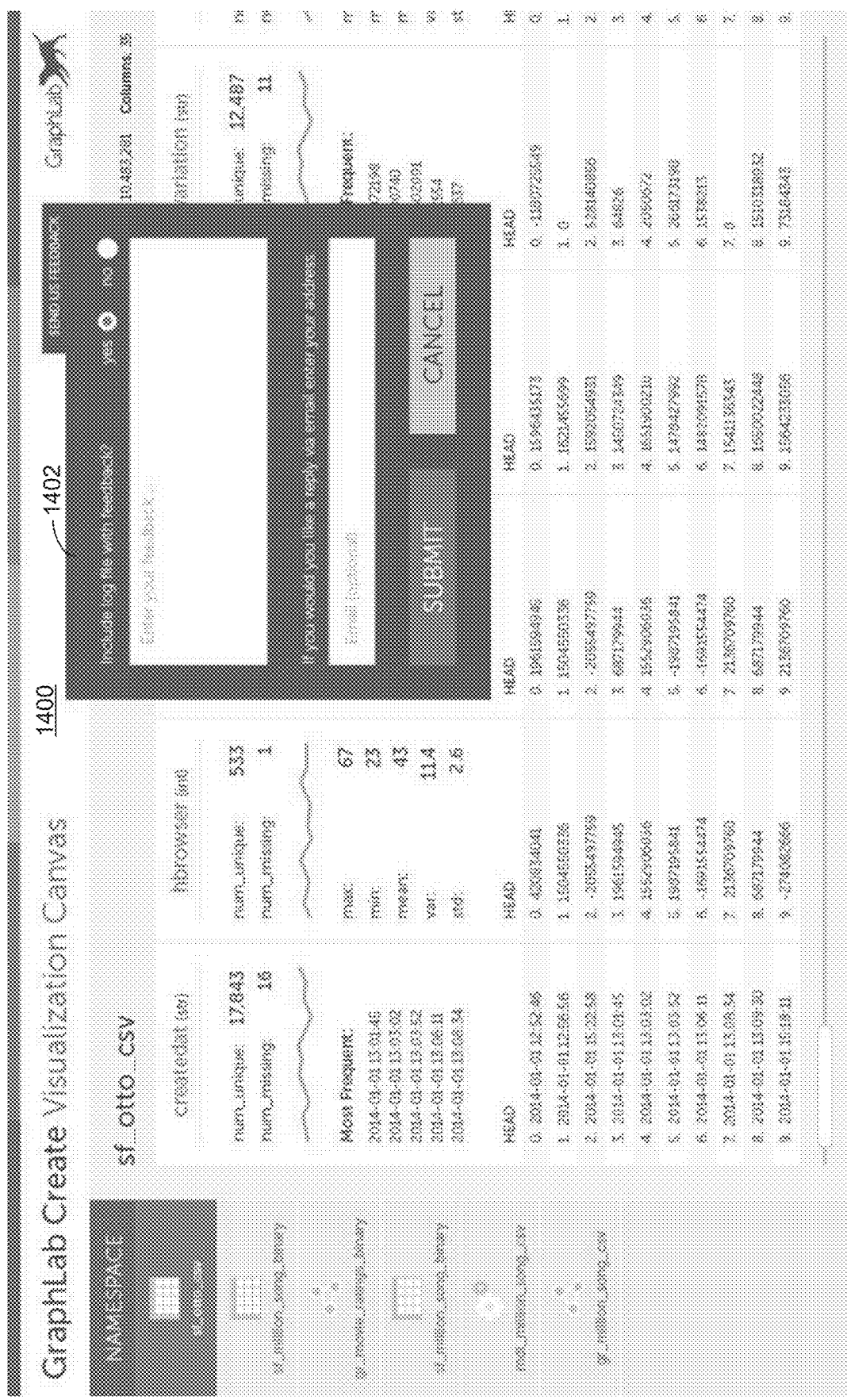
FIG. 14 illustrates an interactive, visual interface including a form for user feedback, in accordance with some embodiments.

FIG. 14 illustrates an interactive, visual interface including a form for user feedback, in accordance with some embodiments. FIG. 14 shows an interactive UI 1400, which is similar to the interactive UI 1300 in FIG. 13 except that the interactive UI 1400 includes a form 1402 for receiving feedback from a user. In the example of FIG. 14, the form 1402 includes options for attaching log files, submitting comments, and entering user contact information. In some embodiments, the form 1402 includes other common fields such as user name and/or other options such as for attaching screenshots at the like.

FIGS. 15 and 16 illustrate an interactive, visual interface for data exploration during a data import, in accordance with some embodiments. FIG. 15 shows an interactive UI 1500 including graphs and statistics for data from an input file, "sf_otto_csv." The interactive UI 1500 also includes progress bars 1502 and 1504 indicating what percentage of the data corresponding to a particular column ("hbrand" and "hvariation" respectively) has loaded into the visual interface from the input file, "sf_otto_csv." The interactive UI 1600 in FIG. 16 is similar to the interactive UI 1500 except that the data for columns "hbrand" and "hvariation" has loaded into the visual interface and therefore the progress bars have been removed from the interactive UI 1600.

Figure 17:
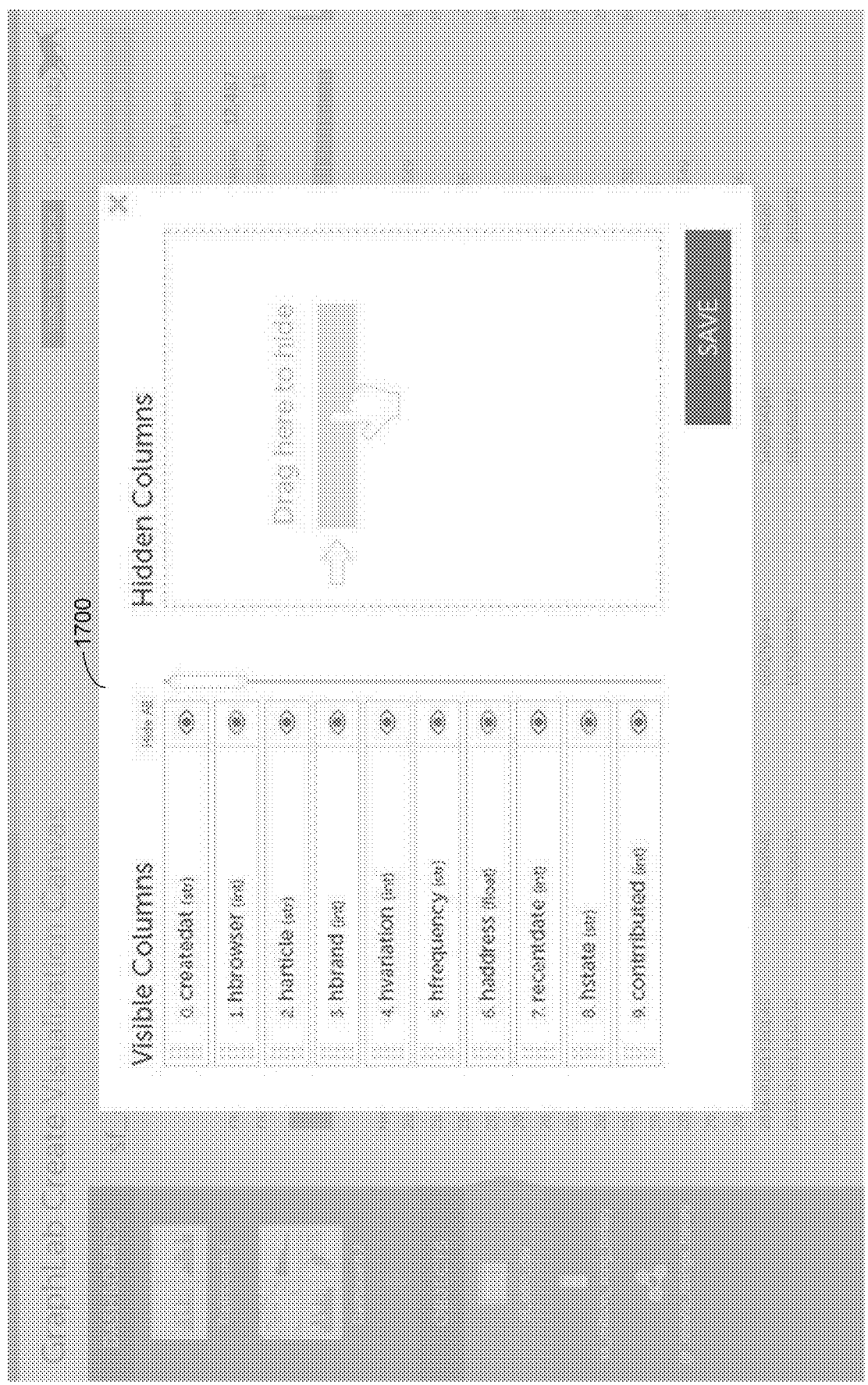
FIGS. 17 and 18 illustrate an interactive, visual interface for adjusting data visualization, in accordance with some embodiments.
Figure 18:
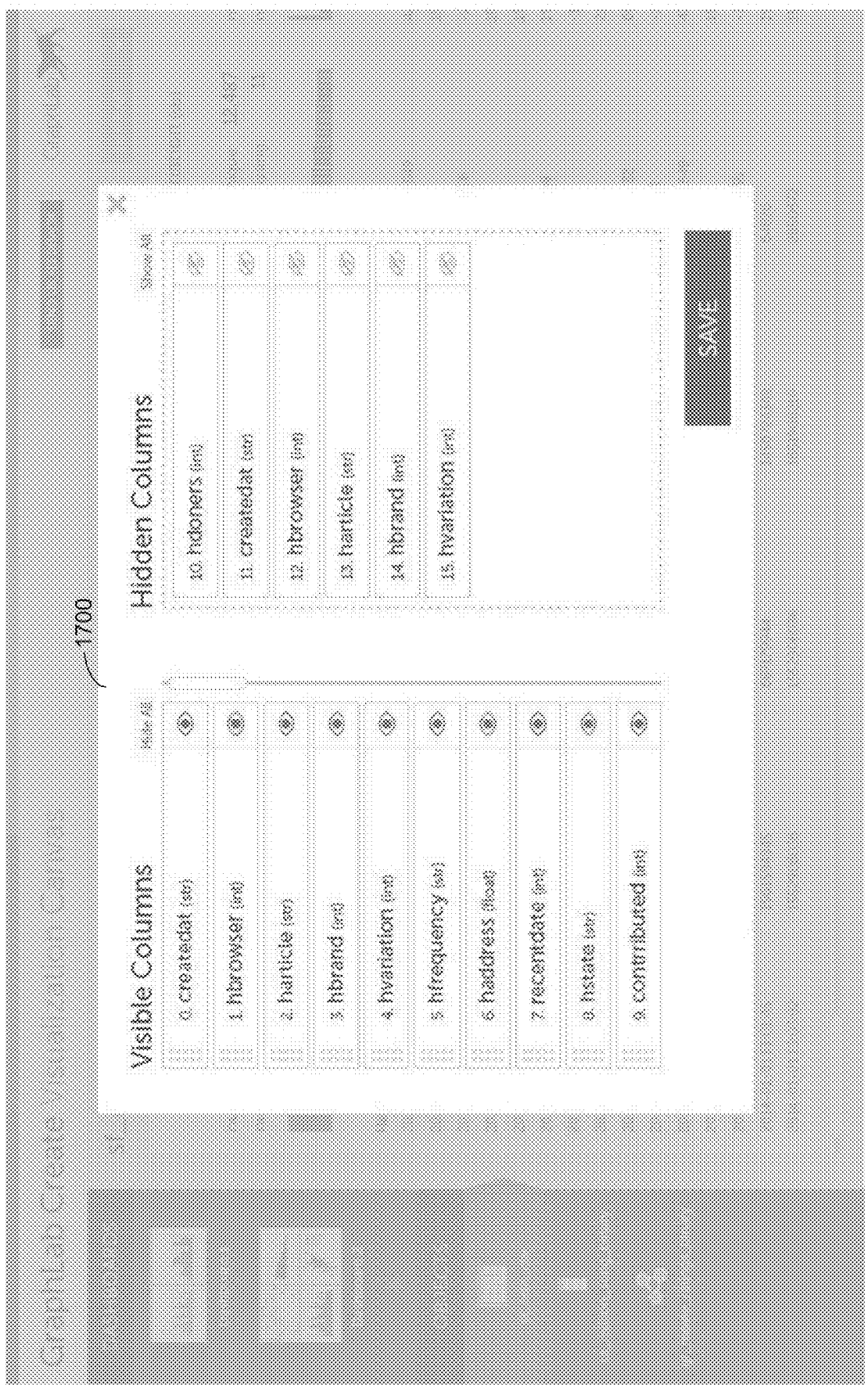

FIGS. 17 and 18 illustrate an interactive, visual interface for adjusting data visualization, in accordance with some embodiments. FIG. 17 shows a menu 1700 for adjusting which columns are hidden and/or displayed in the interactive UI. FIG. 18 shows the menu 1700 with six columns added to the "Hidden Columns" section. In some embodiments, the menu 1700 includes options for adjusting the order in which columns are displayed. In some embodiments, the menu 1700 includes options for highlighting or distinguishing particular columns.

FIG. 19 illustrates an interactive, visual interface for generating new visualization data, in accordance with some embodiments. FIG. 19 shows a menu 1900 for generating and/or displaying additional visualization data. In the example of FIG. 19, data columns can be selected (e.g., dragged to the appropriate part of the menu) to set an X and Y axis for a plot. In some embodiments, the functionality of the menu 1900 is included in the menu 1700. In some embodiments, the menu 1900 includes options for setting the type of plot or graph to be displayed. In some embodiments, the type of plot or graph is determined based on the type of data selected.

Figure 21:
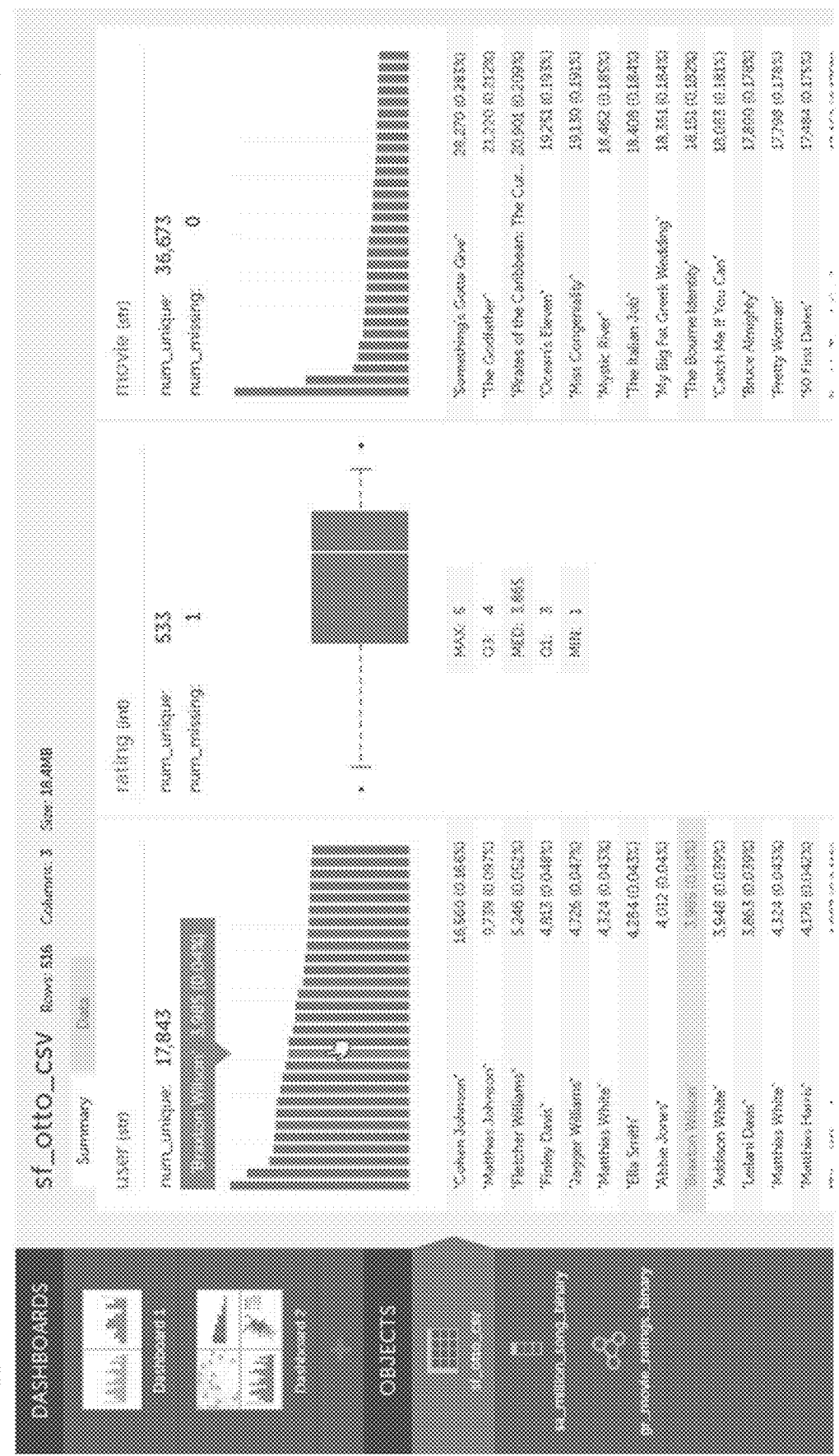

FIGS. 20-22 illustrate an interactive, visual interface for data exploration, in accordance with some embodiments. FIG. 20 shows an interactive UI including a histogram and statistics corresponding to the "rating" column of the "sa_million_song_binary" input file. FIG. 21 shows an interactive UI including bar graphs and quartiles corresponding to three columns of the "sf_otto_csv" input file. FIG. 22 shows an interactive UI 2200 including data from three columns of "sf_otto_csv" in tabular form, namely user data, movie data, and ratings data 2202.

Figure 23:
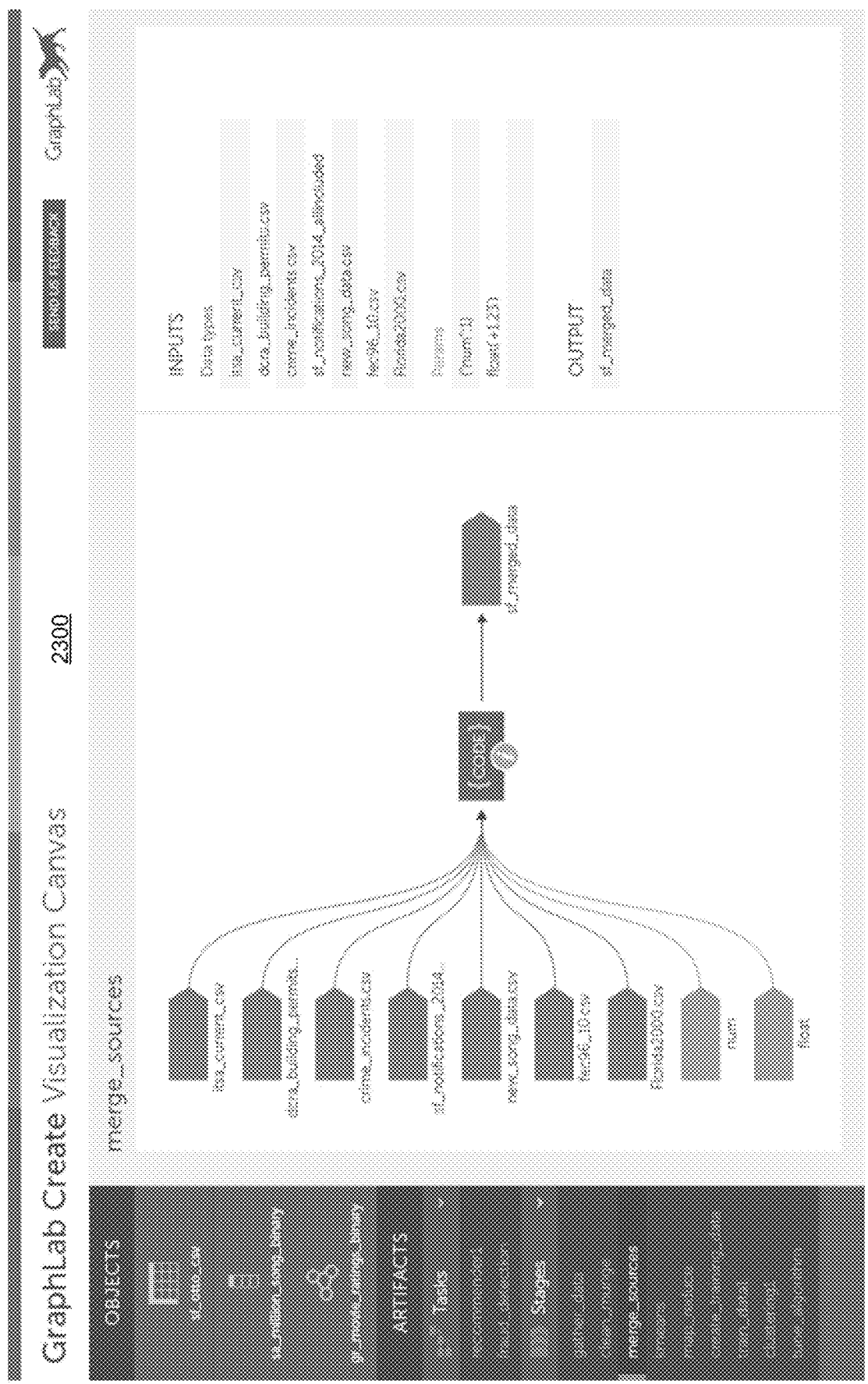
FIGS. 23-24 illustrate an interactive, visual interface including an interactive pipeline workflow visualization, in accordance with some embodiments.
Figure 24:
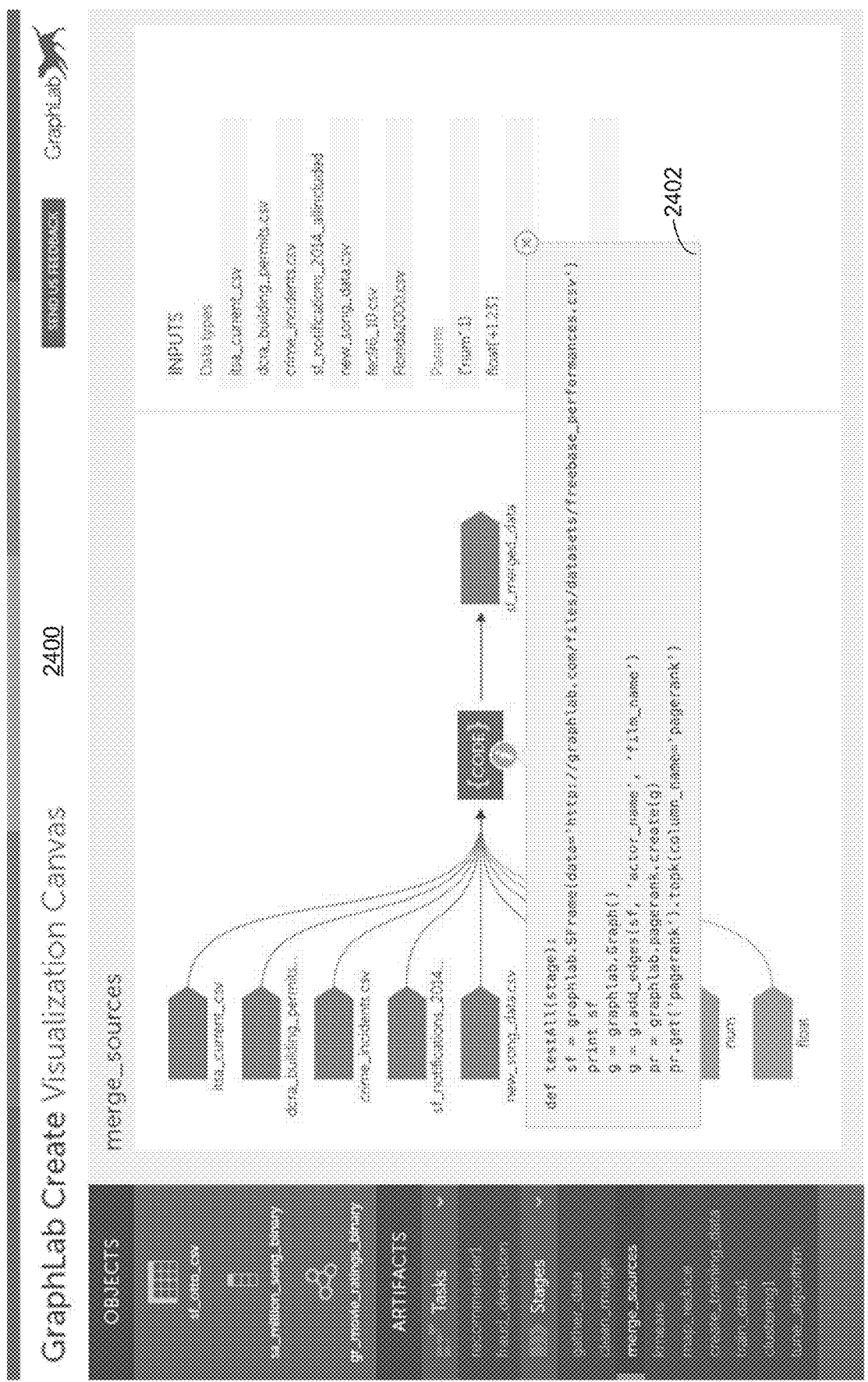

FIGS. 23-24 illustrate an interactive, visual interface including an interactive pipeline workflow visualization, in accordance with some embodiments. FIG. 23 shows an interactive UI 2300, which is similar to the interactive UI 700 shown in FIG. 7. FIG. 24 shows an interactive UI 2400, which is the same as the interactive UI 2300 except that the interactive UI 2400 includes code information 2402 corresponding to the "merge_sources" stage. In the example of FIG. 24, the code information 2402 is displayed as a popup.

Figure 25:
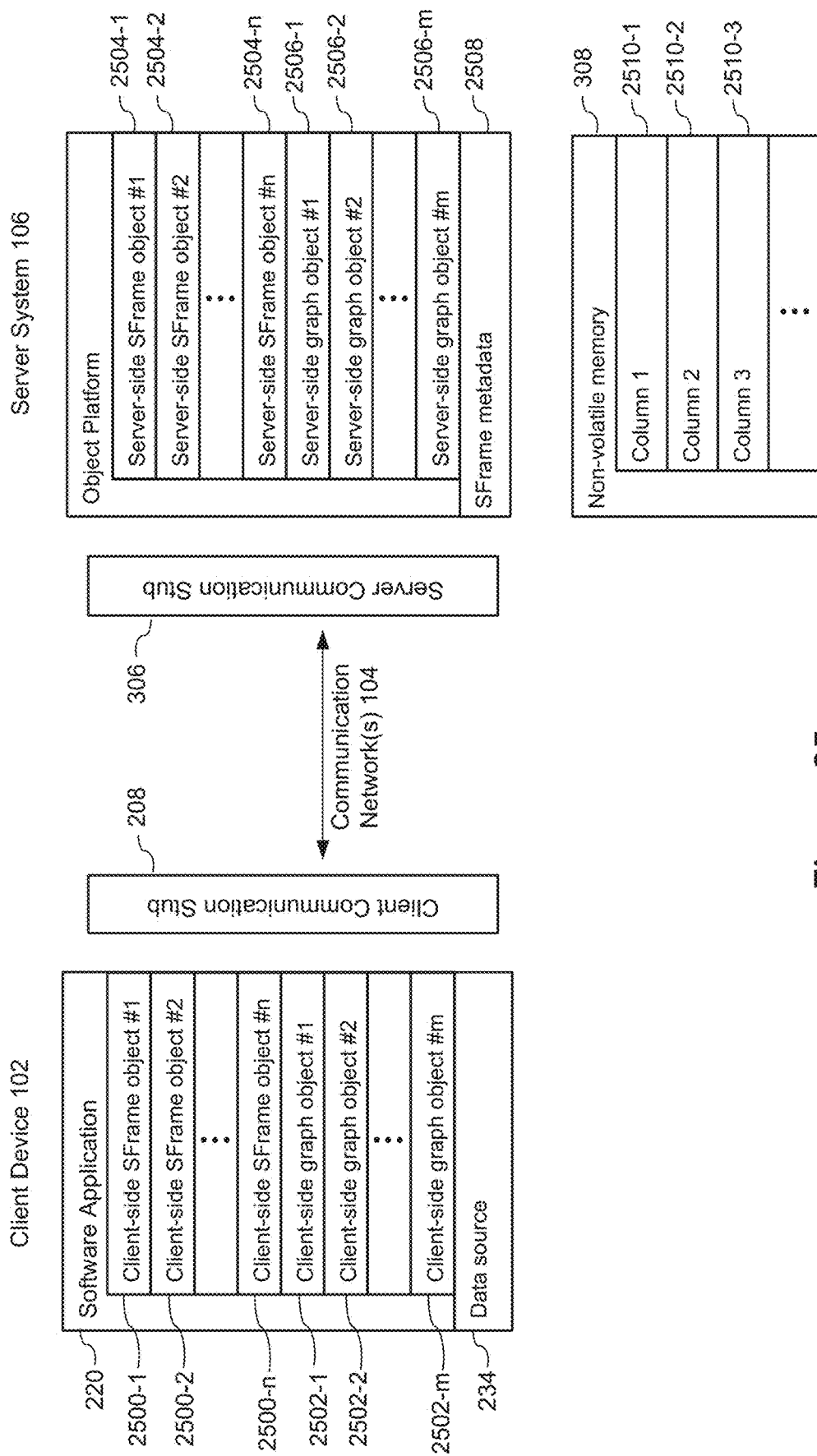
FIG. 25 is a block diagram illustrating the interaction between a client device and a server device according to some embodiments.

FIG. 25 is a block diagram illustrating the interaction between a client device 102 and a server system 106. A user or program at the client device 102 interacts with client-side objects, and those interactions are translated into server-side commands and requests through the client stub 208/server stub 306 connection. In some embodiments, the data structures, modules, applications, or procedures for the client device 102 reside in memory 212, as shown in FIG. 2. In some embodiments, the client device 102 includes a software application 220 that manages various client-side data objects such as client-side SFrame objects 2500 and client-side graph objects 2502. In some embodiments, the software application 220 is written in one or more of Java, C++, Python, PHP, Ruby, or SQL. In some embodiments, some or all of the software application 220 is custom-written by a user 101 at the client device 102. In some embodiments, the software application 220 is written by another user or entity. For example, in some embodiments the software application 220 is written by a commercial software developer or an entity corresponding to the server system 106.

FIG. 25 illustrates creating a sequence of SFrames objects. A user constructs an initial SFrame object #1, and specifies a data source 234. This creates the client side SFrame object 2500-1 and the corresponding server-side SFrame object 2502-1. In some embodiments, the data for the SFrame object is specified during instantiation. In other embodiments, the SFrame object may be created initially as an "empty" object, with data added later. Some embodiments support both approaches. In some embodiments, an SFrame object that is initially empty does not become immutable until it has some data. The data source 234 for the new SFrame 2500-1/2502-1 may be on the client device, stored at the server system 106, or may exist at an external site or device (e.g., on a corporate server where the client device is used). The data source 234 may be in various formats, such as a CSV file, a spreadsheet, an SQL database, a Hive database, and so on. In some embodiments, if the data source does not specify field names or data types for the fields, a user may specify field names or data types. In some embodiments, default field names (e.g., "Field1", "Field2", . . . ) are assigned if the field names are not specified in the data source and not specified by the user as part of creating the SFrame. Similarly, some embodiments infer data types when they are not explicitly specified by the data source or by the user.

FIG. 25 illustrates applying n−1 transformations to the original SFrame, creating new client-side SFrame objects 2500-2, . . . , 2500-n and server-side SFrame objects 2502-2, . . . , 2502-n. Embodiments typically support a wide variety of transformations. The transformations include adding new rows (e.g., appending from another data source), adding additional columns (e.g., importing from another data source or using a formula that computes new values based on the existing columns), removing rows or columns, or "modifying" an existing column. Because SFrames are immutable, each transformation creates a new SFrame, without modifying the existing SFrame. Formulas for new or modified columns can use complex expressions that include numeric functions, string functions, comparison operators, Boolean operators, date functions, and so on. In some embodiments, each of the server-side objects in the sequence 2502-1 to 2502-n uses the same SFrame ID, and uses version or sequence numbers to distinguish them. In other embodiments, each of the SFrame objects has a distinct SFrame ID. In embodiments that use version numbers, when reading data from an SFrame the default is to use the current version number unless the request from the client specifies the version number.

In some embodiments, the data for SFrame object # n 2502-n is stored as columns in non-volatile memory 308 (e.g., a hard disk or solid state memory). For example, the data may be stored in columns 22602-1, 22602-2, and 22602-3, each corresponding to an SArray. Information about SFrames and SArrays may be stored in the SFrame metadata 2508.

In some embodiments, the sequence of transformations identified in FIG. 25 result in new server-side SFrame objects 2504, but there is a single associated client-side SFrame object 2500. In some of these embodiments, when a transformation is applied, the new SFrame ID of the new SFrame object 2504 is returned to the client-side SFrame object 2500. In other embodiments, each new SFrame object uses the same SFrame ID, but has a new version number, so the new version number is returned to the client-side SFrame object.

One use of SFrames is to build graph objects. In some embodiments, the complexity of data sources is handled by SFrames, and thus graph objects can use SFrames as the standard format for source data. For example, in FIG. 25, The SFrame 2500-1/2502-1 was uploaded, and went through a sequence of n−1 transformations. The first graph object 2502-1/2506-1 may be constructed based on the $n^{th}$ SFrame 2500-n/2502-n (or based on any of the intermediate SFrame objects). In some embodiments, a server-side graph object 330 uses the SFrame data directly, without making a new copy of the data. For example, the server side graph object 2506-1 may access the columns 22602-1, 22602-2, and 22602-3 stored in non-volatile memory. In some embodiments, when a graph object is created, a copy of the data from the SFrame is made.

Like SFrame objects, some embodiments allow graph objects to be transformed, and each transformation results in a new graph instance, as illustrated in FIG. 25. In this illustration, the original graph object goes through a sequence of m−1 transformations, with intermediate graph objects. For graphs, the transformations can add or remove vertices, add or remove edges between vertices, add or remove vertex properties, or add or remove edge properties.

Figure 26:
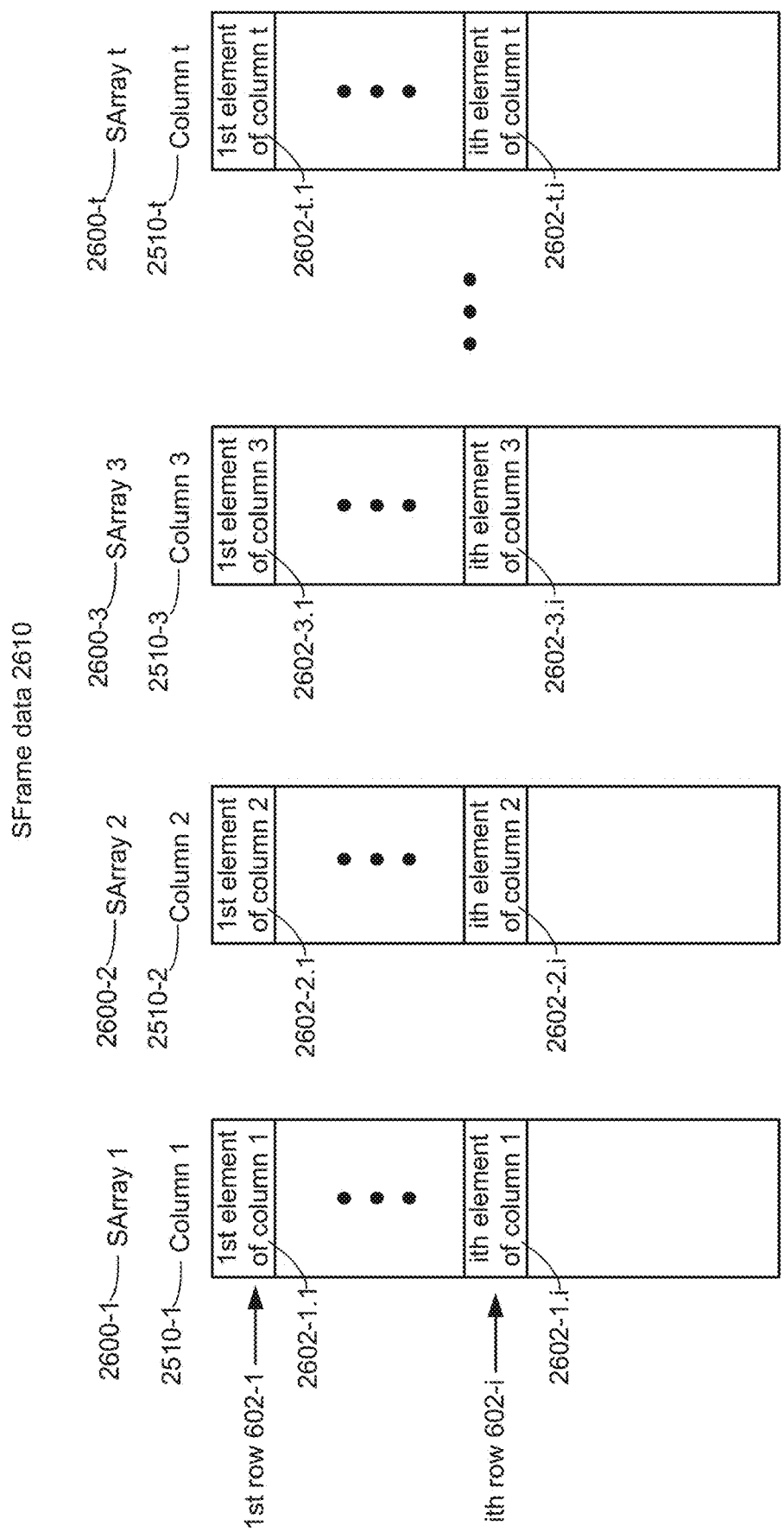
FIG. 26 illustrates several SArrays according to some embodiments.

FIG. 26 illustrates SFrame data 2610. Each SFrame object includes one or more SArray objects 2600-1, 2600-2, 2600-3, . . . , 2600-t. Each SArray object 2600 has corresponding data 2510, such as columns 22602-1, 22602-2, 22602-3, . . . , 22602-t, which are stored as columns of values. Some embodiments use a segmented layout for storage of the columns 2510, as illustrated in FIG. 28B.

Although an SFrame object includes a set of SArray objects, and each SArray has data stored as a column, it is still meaningful to refer to rows of data in an SFrame. A row of data consists of corresponding elements in each of the columns. For example, the first row 602-1 consists of the first elements in each of the columns, including the first element 2602-1.1 of the first column, the first element 2602-2.1 of the second column, the first element 2602-3.1 of the third column, and so on, up to the first row 2602-$t$.1 of the $t^{th}$ column. In general, for any positive integer i (up to the number of data elements in each column), the $i^{th}$ row 602-$i$ consists of the $i^{th}$ element 2602-1.$i$ of the first column, the $i^{th}$ element 2602-2.$i$ of the second column, the $i^{th}$ element 2602-3.$i$ of the third column, and so on, up to the $i^{th}$ element 2602-$t$.$i$ of the $t^{th}$ column. Typically, each of the columns within a single SFrame has the same number of elements, so the last row of the SFrame consists of the last element in each of the columns. Note that a missing element in a column is still a data element (e.g., there is allocated physical storage space), so missing elements do not alter the definition of a row.

Figure 27:
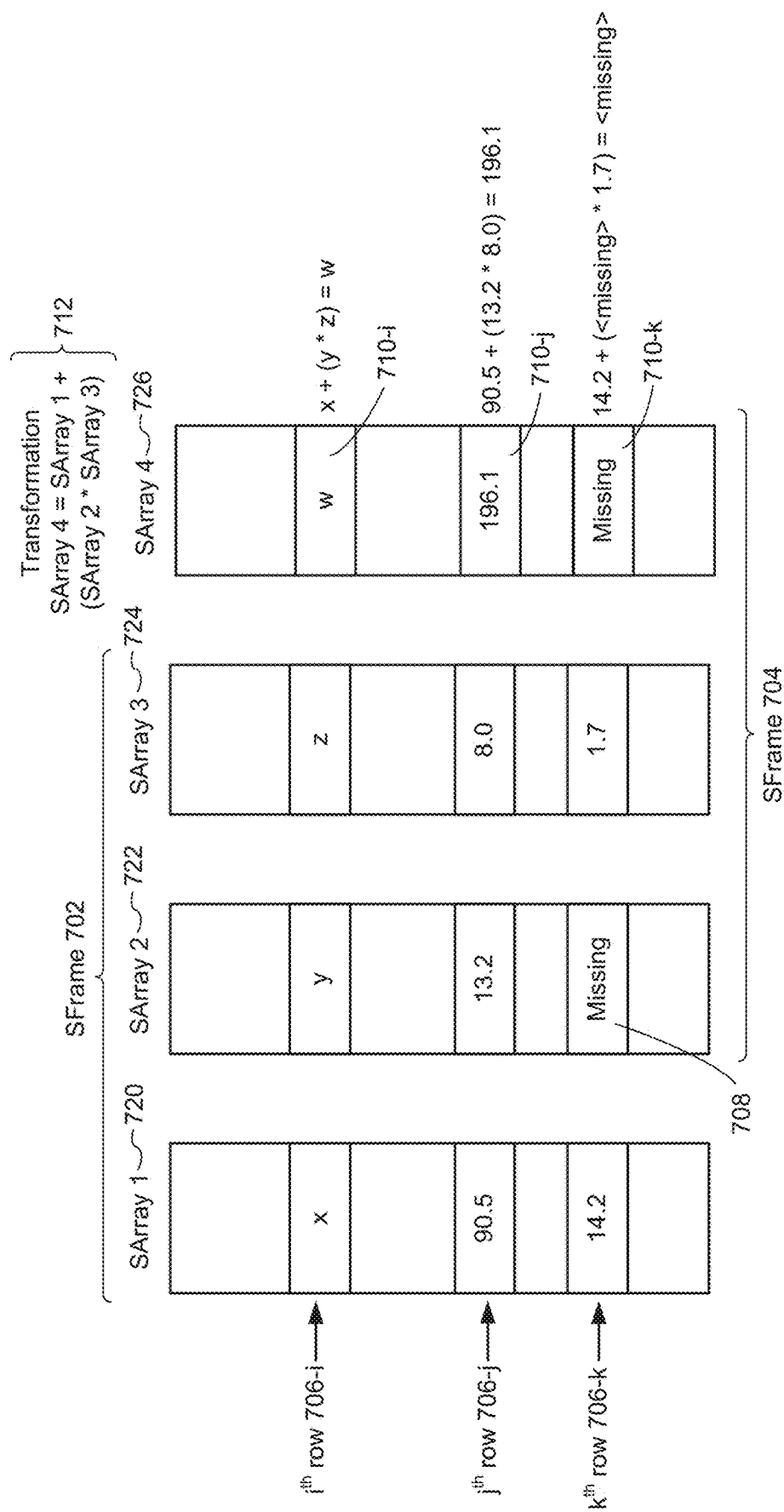
FIG. 27 illustrates how SArrays may be used in scalable frames (SFrames) according to some embodiments.

FIG. 27 illustrates how SArrays may be used in scalable frames (SFrames) according to some embodiments. FIG. 27 illustrates two distinct SFrames 702 and 704, but the SFrames share some of the SArrays. Note that FIG. 27 illustrates the underlying data stored for each SArray, and does not illustrate the other properties and methods of the SArray objects. In this illustration, the first SFrame 702 includes the first three SArrays 720, 722, and 724, and the second SFrame 704 includes the last three SArrays 722, 724, and 726. The SArrays may have many rows (e.g., millions). For illustration, the data for the $i^{th}$ row 706-$i$, the $j^{th}$ row 706-$j$, and the $k^{th}$ row 706-$k$ are shown.

In this example, the second SFrame 704 is derived from the first SFrame 702 by applying a transformation 712. In this example, the data elements in the fourth SArray 726 are computed from the data values in the first three SArrays 720, 722, and 724 using an arithmetic expression, but transformations may use many other formulas or expressions as well. For example, in addition to applying arithmetic functions, transformations can round values, convert data elements from one type to another (e.g., float to int), filter out values within a certain range, perform comparisons, apply Boolean expressions, apply date functions, apply string functions such as concatenation or extraction of substrings, and so on.

The ith row 706-$i$ illustrates how the value 710-$i$ in the fourth SArray 726 is computed from the values in the first three SArrays 720, 722, and 724. Using the formula 712, the value 710-$i$ in the fourth SArray 726 is computed as x+(y*z), where x is the value for the first SArray 720, y is the value for the second SArray 722, and z is the value for the third SArray 724. The $j^{th}$ row 706-$j$ illustrates the calculation applied to specific data values to compute the value 710-$j$ for the fourth SArray 710-$j$. The $k^{th}$ row 706-$k$ illustrates what occurs when one or more data values is missing. Because the data value 708 for the $k^{th}$ row of the second SArray 722 is missing, the formula 712 produces a missing value 710-$k$ for the fourth SArray 726. If any of the data values used by a formula are missing, the result is a missing value. In some embodiments, a user may specify a default value for the result if any of the input values are missing (e.g., set the result of an arithmetic calculation to be 0 if any of the input values are missing). Some embodiments provide functions to give users greater control for handling missing values. For example, some embodiments provide a binary ISMISSING( ) function where the first argument is a variable representing a column, and the second argument is the substitute value to use when the value of the first argument is missing.

In some embodiments, at least a portion of a respective SFrame or SArray is stored in cache memory. In some embodiments, this allows for fast retrieval of a respective SFrame or SArray by one or more users of the server, acting as a group-wide cached memory (e.g., a company or department-wide cached memory).

In some embodiments, SFrames or SArrays are accessible to users other than the one who created them. The SFrame metadata 2508 indicates the data source as well as the transformations that have been applied, so if another user wants to create an SFrame whose data already exists, the data need not be re-uploaded or re-transformed. For example, if another user wants an SFrame that includes the data from the first SArray 720 and the fourth SArray 726, the "new" SFrame can be created by just pointing to the existing data for these two SArrays. This can be particularly useful in an environment where multiple people are accessing the same data, especially when the data set is large (e.g., millions or hundreds of millions of records).

Figure 28A:
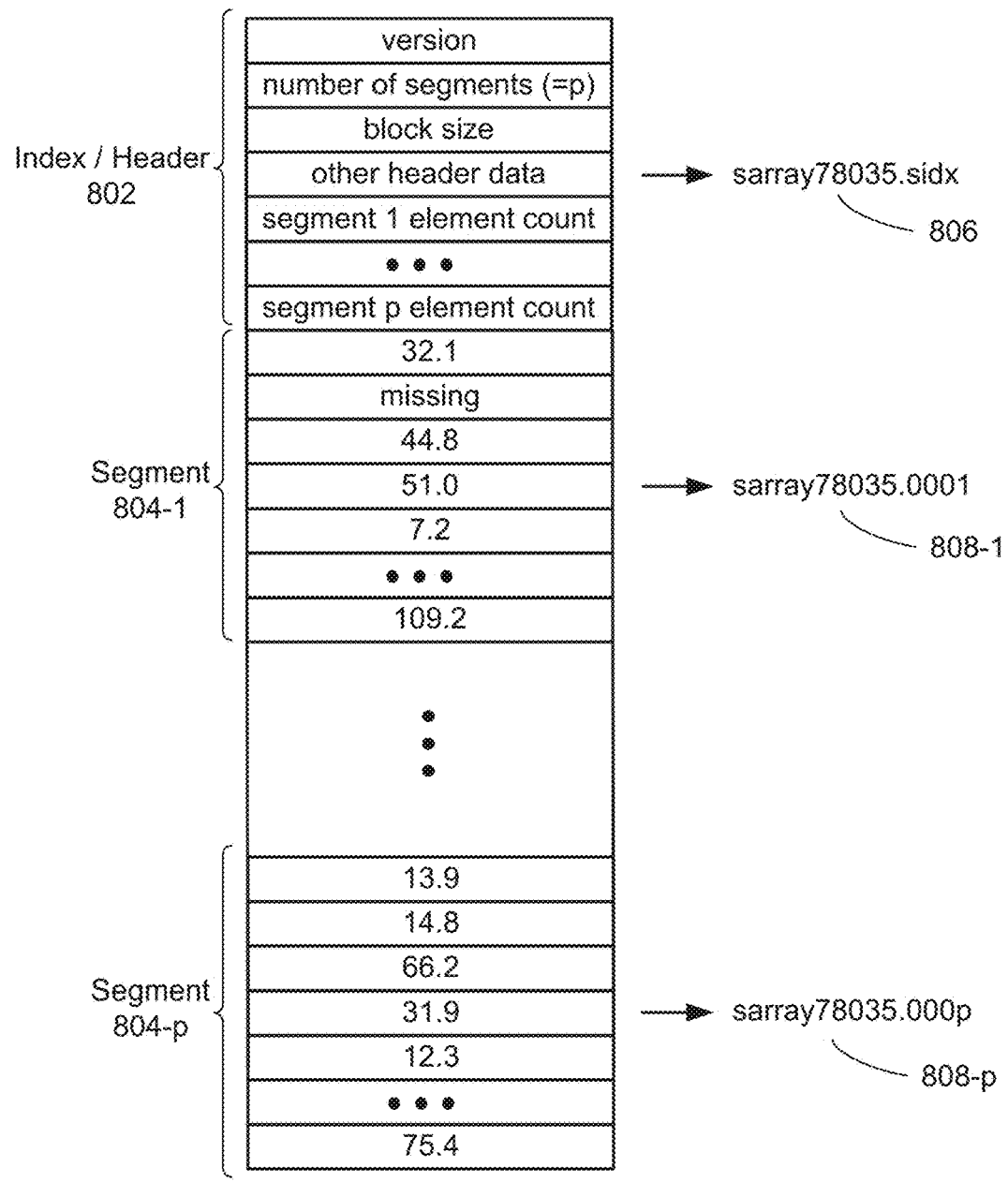
FIG. 28A illustrates a physical layout of an SArray according to some embodiments.
Figure 28B:
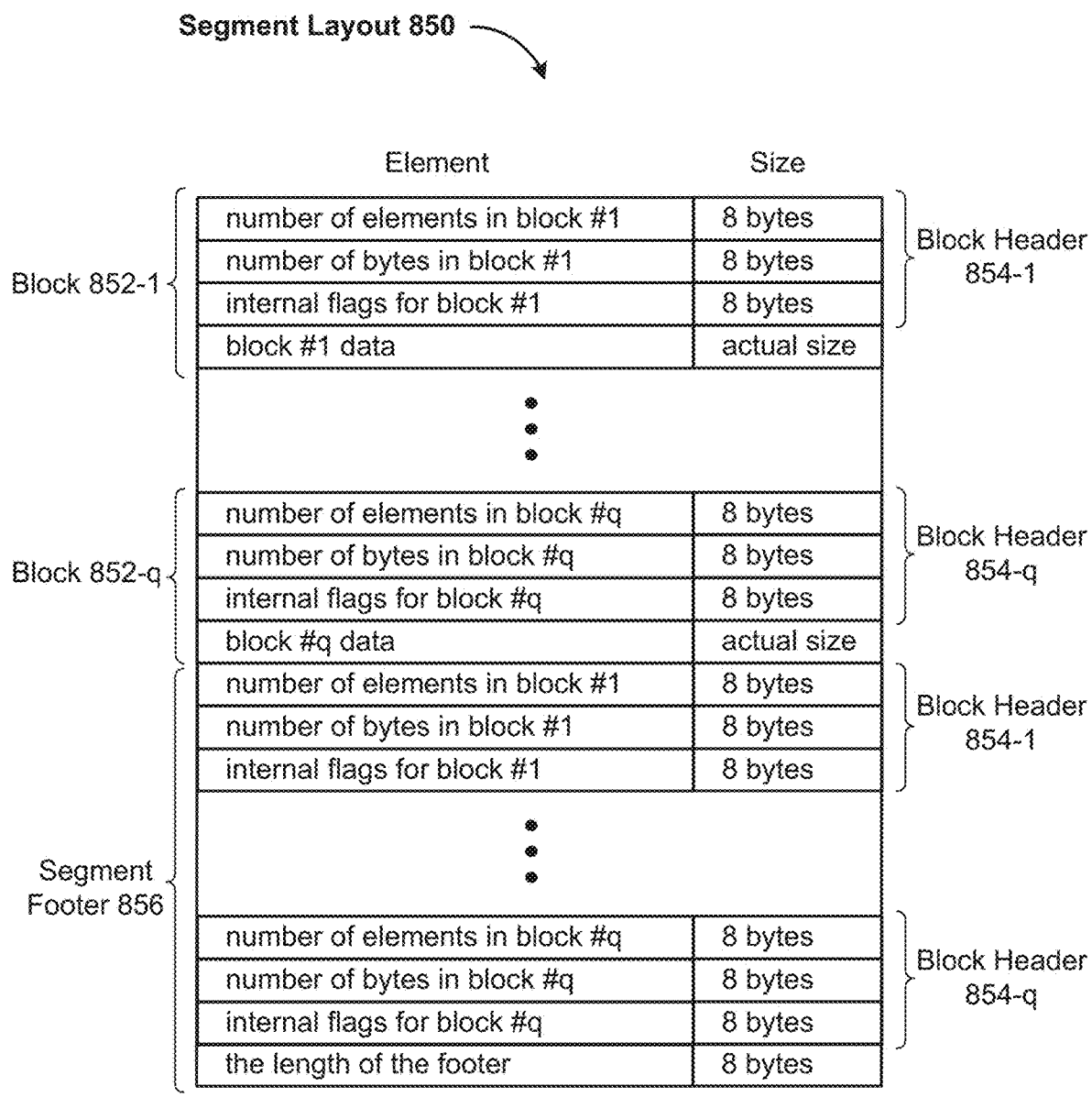
FIG. 28B illustrates a physical layout of a segmented SArray according to some embodiments.
Figure 29A:
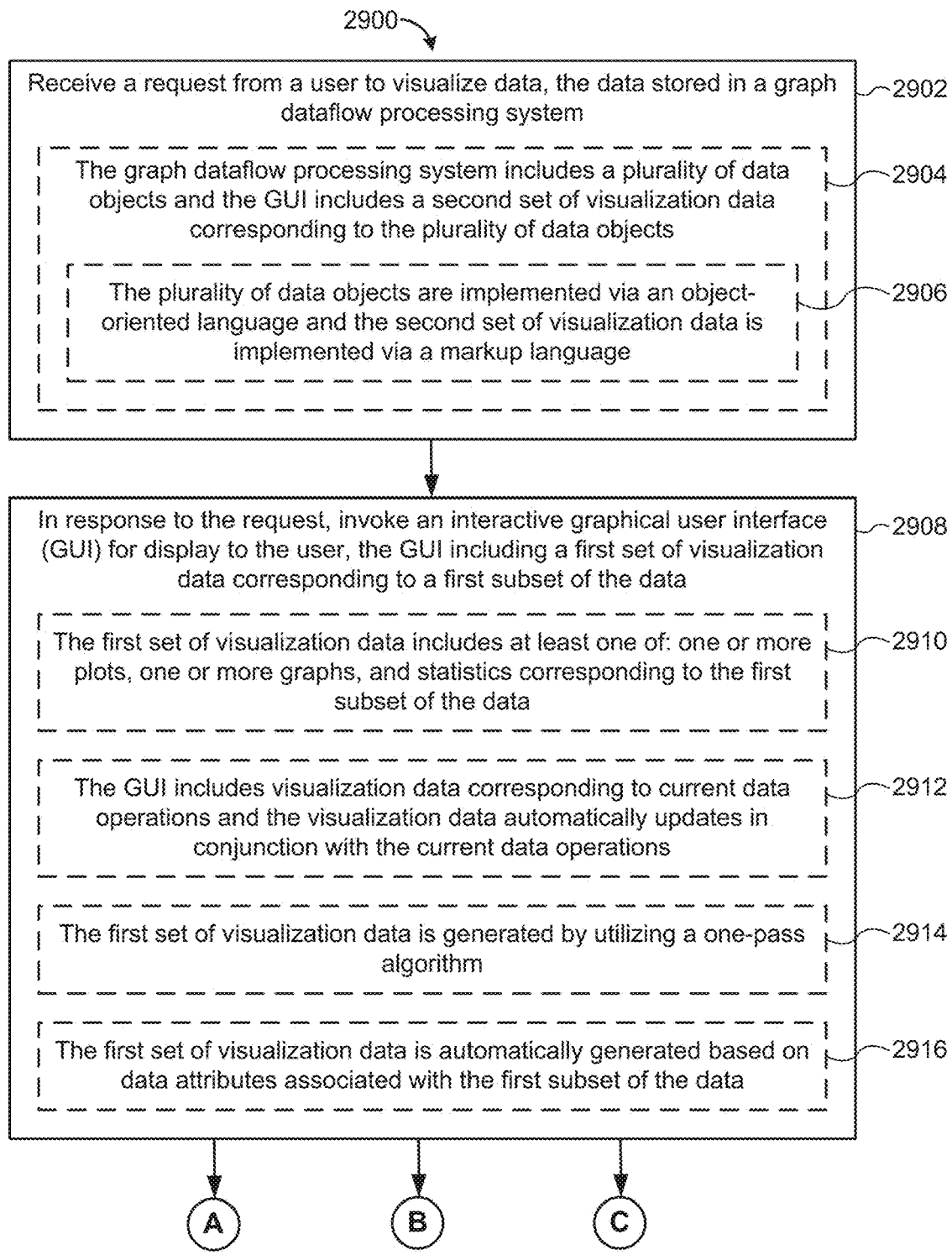
FIGS. 29A-29D illustrate a flowchart representation of a method of data visualization, in accordance with some embodiments.
Figure 29B:
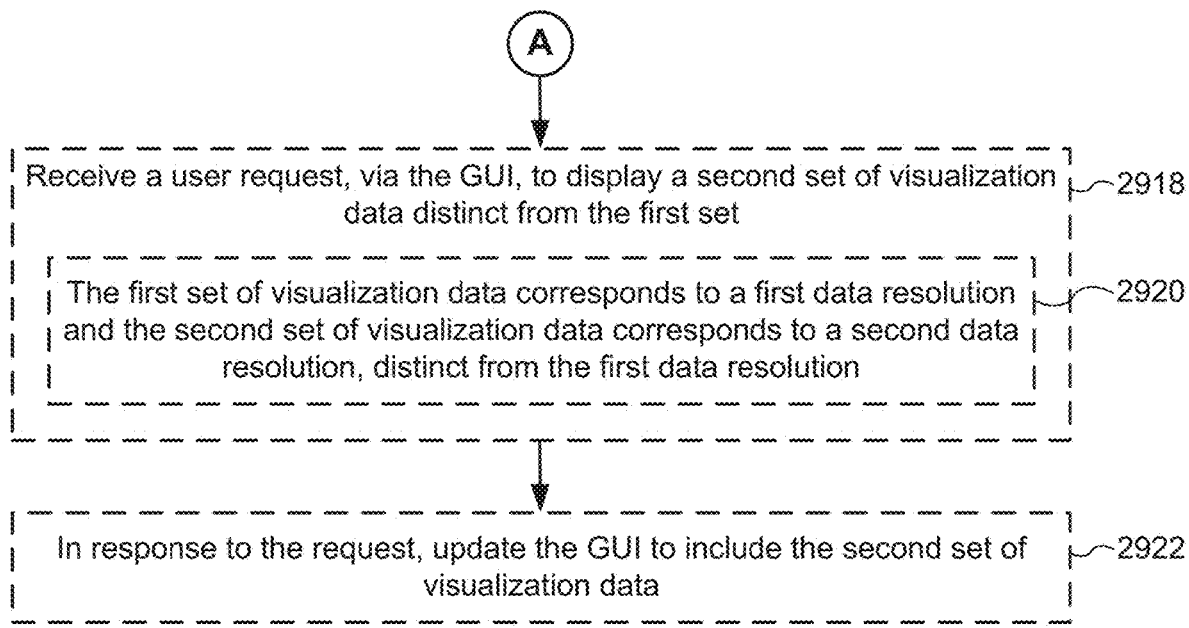
Figure 29C:
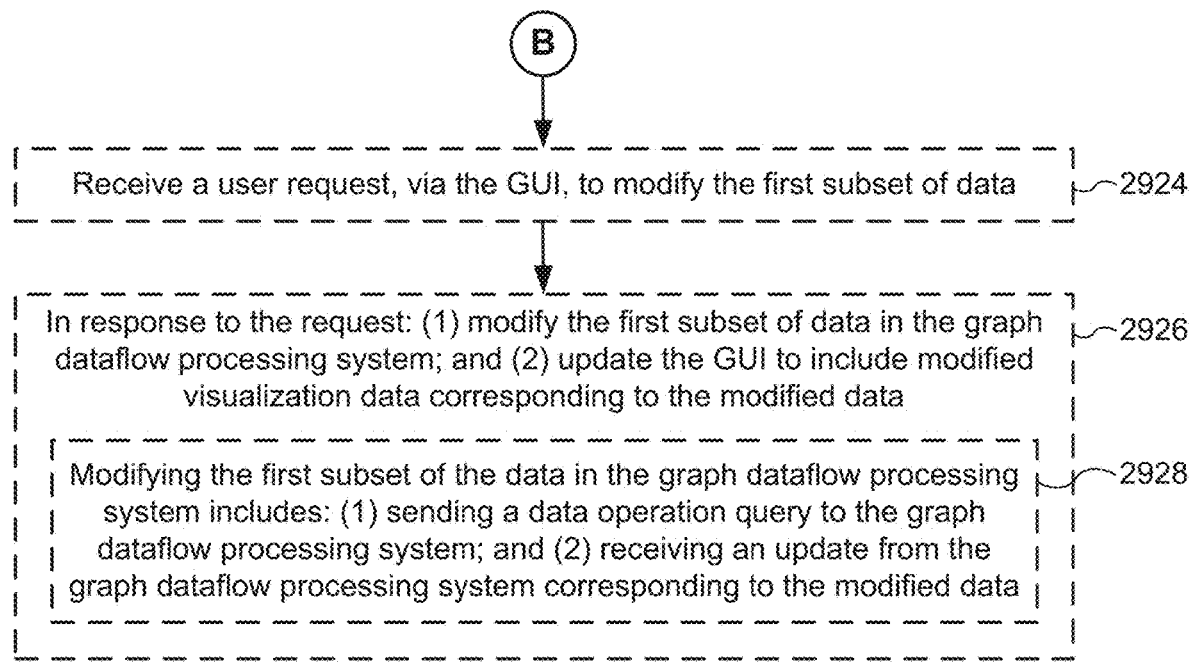
Figure 29D:
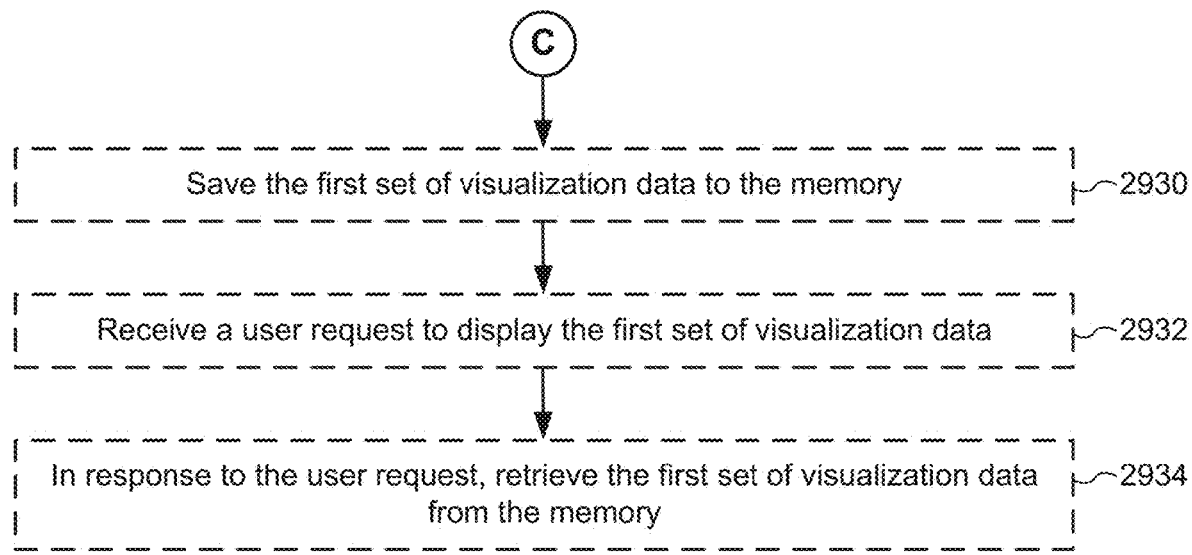

FIG. 28A illustrates an alternative physical layout of an SArray according to some embodiments. In this format, the data values for the SArray are placed into segments. The SArray includes an index file and one or more data segment files, which are typically all stored on the same directory. Some embodiments use file naming conventions to indicate which files are grouped together. For example, in some embodiments, the index file 806 and each of the segment files 808-1, . . . , 808-$p$ have the same base file name, and use different file extensions to indicate the roles. For example, some embodiments use the file extension "sidx" for the index file and numeric strings such as "0001", "0002", . . . , "000p" for the segments, numbered in order, where p is the number of segments. If p is greater than 9, the extension is formatted accordingly (e.g., if there are 149 segments, then the last segment has extension "0149"). In some embodiments, the segment numbers start with "0000" for the first segment. In some embodiments, the file names are correlated based on metadata stored elsewhere, such as the database 324.

The index file 806 includes header information 802, which is metadata about the SArray. In some embodiments, the header 802 includes a version number. Different header versions may include different data or have different amounts of space allocated for the header fields. In some embodiments, the header includes a field that specifies the number of segments for the SArray. In some embodiments, each data segment 804 is further subdivided into blocks, as illustrated below in FIG. 28B. Some of these embodiments specify the block size in the header 802. Some embodiments included additional header data in the header 802. In some embodiments, there is a fixed number of data elements in each of the segments 804, or a fixed maximum number of data elements, which is included in the header 802. Because different data types require different amounts of storage, the number of data elements in each segment may differ between columns. In some embodiments, the last portion of the header 802 specifies the number of data elements in each of the segments. For this reason, a header file 806 is typically not a fixed size.

As illustrated in FIG. 28A, each segment 804 is stored as a separate data file 808. The segments store the underlying data for the SArray. Typically, the data elements within an SArray have fixed sizes, which makes it easy to locate individual data elements. As illustrated in FIG. 28A, some of the data elements may be missing.

In some embodiments, each segment 808 is further subdivided into blocks 852, as illustrated in FIG. 28B. In some embodiments, each block 852 includes a block header 854, which typically has a fixed size, and then the block content. In some embodiments, the size of each block (which may include or exclude the header depending on the implementation) is specified in the header file 806. In some embodiments, the block header 854 for each block specifies the number of elements in the block, the size of the block (e.g., in bytes), and other internal flags. Typically, each data element is stored entirely within a single block, and not split across blocks. In some embodiments, each segment includes a segment footer 856. In some embodiments, the segment footer 856 includes each of the block headers 854-1, . . . , 854-$q$. In some embodiments, the length of the footer itself is specified as the last field in the segment footer 856.

FIGS. 29A-29D illustrate a flowchart representation of a method 2900 of data visualization in a computer system, in accordance with some embodiments. In some embodiments, the computer system is a client device. In some embodiments, the computer system is portable computing device such as a tablet or laptop. In some embodiments, the computer system is a desktop computer. In some embodiments, the computer system includes a client device and a server. In some embodiments, the computer system includes one or more processors and memory coupled to the one or more processors.

In some implementations, method 2900 is performed by a client device (e.g., client device 102-1, FIG. 2) or one or more components of the client device (e.g., the processor(s) 202 and the display device(s) 204, FIG. 2). In some embodiments, method 2900 is governed by instructions that are stored in a non-transitory computer readable storage medium and that are executed by one or more processors of a computer system, such as the one or more processors 202 of client device 102-1 and/or the one or more processors 302 of server 300, as shown in FIGS. 2 and 3.

The computer system receives (2902) a request from a user to visualize data, the data stored in a graph dataflow processing system. In some embodiments, the request is received via a terminal such as the terminal shown in FIG. 4. In some embodiments, the request is via an ipython notebook.

In some embodiments, the graph dataflow processing system includes (2904) a plurality of data objects and the GUI includes a second set of visualization data corresponding to the plurality of data objects.

In some embodiments, the plurality of data objects is implemented (2906) via an object-oriented language and the second set of visualization data is implemented via a markup language. In some embodiments, the plurality of data objects is implemented via an interpreted language such as Java or Ruby. For example, FIG. 9 shows data corresponding to Python objects visualized using HTML and JavaScript.

In response to the request, the computer system invokes (2908) an interactive graphical user interface (GUI) for display to the user, the GUI including a first set of avisualization data corresponding to a first subset of the data. For example, in response to the request received via the terminal shown in FIG. 4, GUI 500 of FIG. 5 is invoked.

In some embodiments, the first set of visualization data includes (2910) at least one of: one or more plots, one or more graphs, and statistics corresponding to the first subset of the data. For example, FIG. 5 shows a set of visualization data including graphs 502-1 through graphs 502-6. As another example, FIG. 13 shows a GUI 1300 including plots 1302-1 through 1302-5 and statistics 1304-1 through 1304-5.

In some embodiments, the GUI includes (2912) visualization data corresponding to current data operations and the visualization data automatically updates in conjunction with the current data operations. For example, FIGS. 15 and 16 show GUIs 1500 and 1600, which include visualization data. FIGS. 15 and 16 further show the visualization data updating in accordance with a data operation.

In some embodiments, the first set of visualization data is generated (2914) by utilizing a one-pass algorithm. For example, the first set of visualization data is generated by a sketch summary function as described in Table 12. As another example, FIG. 15 shows interactive UI 1500 including statistics such as "num_unique" and "num_missing" being generated using a one-pass algorithm.

In some embodiments, the first set of visualization data is (2916) automatically generated based on data attributes associated with the first subset of the data. For example, the menu 1900 in FIG. 19 generates a new plot based on the data attributes of the selected data.

In some embodiments, the computer system receives (2918) a user request, via the GUI, to display a second set of visualization data distinct from the first set. For example, FIGS. 18 and 19 show menu 1700 for adjusting display of data in the GUI.

In some embodiments, the first set of visualization data corresponds to (2920) a first data resolution and the second set of visualization data corresponds to a second data resolution, distinct from the first data resolution. For example, FIG. 10 shows histogram 1002 (e.g., a first set of visualization data) and histogram 1004 (e.g., a second set of visualization data). FIG. 10 also shows histogram 1004 displaying data at a higher resolution than histogram 1002.

In some embodiments, in response to the request received in (2918), the computer system updates (2922) the GUI to include the second set of visualization data. For example, in response to the columns added to "Hidden Columns" in FIG. 18, the GUI would update to remove display of those columns.

In some embodiments, the computer system receives (2924) a user request, via the GUI, to modify the first subset of data. In response to the request (2924), the computer system: (1) modifies (2926) the first subset of data in the graph dataflow processing system; and (2) updates the GUI to include modified visualization data corresponding to the modified data. For example, FIG. 22 shows a GUI 2200 including rating data 2202. In accordance with some embodiments, the rating data 2202 is modified by a user and, in response; both the graph dataflow processing system and the GUI are updated to reflect the modification. In some embodiments, the input file is updated to reflect the modification.

In some embodiments, modifying the first subset of the data in the graph dataflow processing system includes: (1) sending a data operation query to the graph dataflow processing system; and (2) receiving an update from the graph dataflow processing system corresponding to the modified data. For example, the query is sent from the presentation module 222 of client device 102-1 in FIG. 2 to the graph dataflow module (or to the query module 226 within the graph dataflow module). In this example, the graph dataflow module 224 updates the database 234 and sends a response to the presentation module 222. In some embodiments, the presentation module 222 sends a query via communication interface(s) 208 to server 300 (e.g., to request module 322)

and the server updates database(s) 324 and sends a response to the presentation module 222 via communication interface(s) 306.

In some embodiments, the computer system: saves (2930) the first set of visualization data to memory; receives (2932) a user request to display the first set of visualization data; and, in response to the user request, retrieves (2934) the first set of visualization data from memory. In some embodiments, the computer system saves the first set of visualization data to computer readable medium(s) 212 in FIG. 2. For example, the computer system saves the first set of visualization data within database 234. In some embodiments, the computer system saves the first set of visual data to computer readable medium(s) 308 in FIG. 3. For example, the computer system saves the first set of visualization data within database(s) 324. In some embodiments, the first set of visualization data is saved to a dashboard associated with the user. For example, FIG. 15 shows dashboard 1 and dashboard 2 associated with the user. In accordance with some embodiments, the user request to display the first set of visualization data is sent in response to the user selecting dashboard 1 from the dashboards panel.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, performed by a computing system having one or more processors and memory, the method comprising:
   receiving a request in a machine learning application development environment to visualize data objects in a machine learning application, wherein the machine learning application development environment includes an interactive code interface that permits modification and execution of code of the machine learning application, the code is associated with a namespace that includes respective variable names for the data objects, and the data objects are stored in a graph dataflow processing system; and
   in response to the request:
      determining a plurality of data objects that are in the namespace of the machine learning application development environment;
      accessing one or more columns of data stored as part of a first data object in the plurality of database objects in the namespace to compute one or more approximate values for one or more statistics of data in individual columns in the one or more columns, wherein the one or more approximate values is computed in a single pass of an individual column of the first data object via one or more respective sketch summary functions, and the one or more approximate values is approximate but satisfies a closeness guarantee to one or more actual values of the one or more statistics; and
      invoking an interactive graphical user interface (GUI) for display in the machine learning application development environment, wherein the GUI displays respective visualization data that summarizes individual ones of the plurality of data objects, including a first set of visualization data for the first data object that indicates the one or more approximate values of the one or more statistics, and wherein the GUI permits navigation through the plurality of data objects in the namespace to display additional visualization data for individual ones of the plurality of data objects.

2. The method of claim 1, wherein the first set of visualization data includes at least one of:
   one or more plots,
   one or more graphs, and
   statistics corresponding to the data object.

3. The method of claim 1, further comprising:
   receiving a user request, via the GUI, to display a second set of visualization data distinct from the first set; and
   in response to the request, updating the GUI to include the second set of visualization data.

4. The method of claim 3, wherein the first set of visualization data corresponds to a first data resolution and the second set of visualization data corresponds to a second data resolution, distinct from the first data resolution.

5. The method of claim 1, wherein the GUI includes visualization data corresponding to current data operations and the visualization data automatically updates in conjunction with the current data operations.

6. The method of claim 1, further comprising:
   receiving a user request, via the GUI, to modify the first data object; and
   in response to the request:
      modifying the first data object in the graph dataflow processing system; and
      updating the GUI to include modified visualization data corresponding to the modified data object.

7. The method of claim 6, wherein modifying the first data object in the graph dataflow processing system comprises:
   sending a data operation query to the graph dataflow processing system; and
   receiving an update from the graph dataflow processing system corresponding to the modified data object.

8. The method of claim 1, wherein the at least one of the one or more respective sketch summary functions is tunable to adjust an accuracy of an approximate value of a statistic produced via the sketch summary function to change a resolution of a visualization data for the approximate value.

9. The method of claim 1, wherein the GUI includes a second set of visualization data summarizing a second one of the plurality of data objects, wherein the second data object is of a different type from the first data object.

10. The method of claim 9, wherein the plurality of data objects are implemented via an object-oriented language; and
    wherein the second set of visualization data is implemented via a markup language.

11. The method of claim 1, further comprising:
    saving the first set of visualization data to the memory;
    receiving a user request to display the first set of visualization data; and
    in response to the user request, retrieving the first set of visualization data from the memory.

12. The method of claim 1, wherein the first set of visualization data is automatically generated based at least in part on data attributes associated with the first data object.

13. A system comprising one or more processors, memory, and one or more programs stored in the memory for execution by the one or more processors, the one or more programs comprising instructions for:
    receiving a request in a machine learning application development environment to visualize data objects in a machine learning application, wherein the machine learning application development environment includes an interactive code interface that permits modification and execution of code of the machine learning application, the code is associated with a namespace that includes respective variable names for the data objects, and the data objects are stored in a graph dataflow processing system; and in response to the request:
  determining a plurality data objects that are in the namespace of the machine learning application development environment;
  accessing one or more columns of data stored as part of a first data object in the plurality of database objects in the namespace to compute one or more approximate values for one or more statistics of data in individual columns in the one or more columns, wherein the one or more approximate values is computed in a single pass of an individual column of the first data object via one or more respective sketch summary functions, and the one or more approximate values is approximate but satisfies a closeness guarantee to one or more actual values of the one or more statistics; and
  invoking an interactive graphical user interface (GUI) for display in the machine learning application development environment, wherein the GUI displays respective visualization data that summarizes individual ones of the plurality of data objects, including a first set of visualization data for the first data object that indicates the one or more approximate values of the one or more statistics, and wherein the GUI permits navigation through the plurality of data objects in the namespace to display additional visualization data for individual ones of the plurality of data objects.

14. The system of claim 13, the one or more programs further comprising instructions for:
  receiving a user request, via the GUI, to display a second set of visualization data distinct from the first set; and
  in response to the request, updating the GUI to include the second set of visualization data.

15. The system of claim 13, the one or more programs further comprising instructions for:
  receiving a user request, via the GUI, to modify the first data object; and
  in response to the request:
    modifying the first data object in the graph dataflow processing system; and
    updating the GUI to include modified visualization data corresponding to the modified data object.

16. The system of claim 13, the one or more programs further comprising instructions for:
  saving the first set of visualization data to the memory;
  receiving a user request to display the first set of visualization data; and
  in response to the user request, retrieving the first set of visualization data from the memory.

17. A non-transitory computer-readable storage medium, storing one or more programs for execution by one or more processors of a storage device, the one or more programs including instructions for:

receiving a request in a machine learning application development environment to visualize data objects in a machine learning application, wherein the machine learning application development environment includes an interactive code interface that permits modification and execution of code of the machine learning application, the code is associated with a namespace that includes respective variable names for the data objects, and the data objects are stored in a graph dataflow processing system used to develop the machine learning application; and in response to the request:
    determining a plurality data objects that are in the namespace of the machine learning application development environment;
    accessing one or more columns of data stored as part of a first data object in the plurality of database objects in the namespace to compute one or more approximate values for one or more statistics of data in individual columns in the one or more columns, wherein the one or more approximate values is computed in a single pass of an individual column of the first data object via one or more respective sketch summary functions, and the one or more approximate values is approximate but satisfies a closeness guarantee to one or more actual values of the one or more statistics; and
    invoking an interactive graphical user interface (GUI) for display in the machine learning application development environment, wherein the GUI displays respective visualization data that summarizes individual ones of the plurality of data objects, including a first set of visualization data for the first data object that indicates the one or more approximate values of the one or more statistics, and wherein the GUI permits navigation through the plurality of data objects in the namespace to display additional visualization data for individual ones of the plurality of data objects.

18. The storage medium of claim 17, the one or more programs further including instructions for:
  receiving a user request, via the GUI, to display a second set of visualization data distinct from the first set; and
  in response to the request, updating the GUI to include the second set of visualization data.

19. The storage medium of claim 17, the one or more programs further including instructions for:
  receiving a user request, via the GUI, to modify the first data object; and
  in response to the request:
    modifying the first data object in the graph dataflow processing system; and
    updating the GUI to include modified visualization data corresponding to the modified data object.

20. The storage medium of claim 17, the one or more programs further including instructions for:
  saving the first set of visualization data to the memory;
  receiving a user request to display the first set of visualization data; and
  in response to the user request, retrieving the first set of visualization data from the memory.

* * * * *